United States Patent
Imai et al.

(10) Patent No.: US 12,298,221 B2
(45) Date of Patent: May 13, 2025

(54) OBSERVATION DEVICE

(71) Applicants: ThinkCyte K.K., Tokyo (JP); The University of Tokyo, Tokyo (JP)

(72) Inventors: Toru Imai, Tokyo (JP); Sadao Ota, Tokyo (JP)

(73) Assignees: ThinkCyte K.K., Tokyo (JP); The University of Tokyo, Tokyo (JP)

( * ) Notice: Subject to any disclaimer, the term of this patent is extended or adjusted under 35 U.S.C. 154(b) by 137 days.

(21) Appl. No.: 17/935,707

(22) Filed: Sep. 27, 2022

(65) Prior Publication Data

US 2023/0012588 A1 Jan. 19, 2023

Related U.S. Application Data

(63) Continuation of application No. PCT/JP2021/013564, filed on Mar. 30, 2021.

(30) Foreign Application Priority Data

Apr. 1, 2020 (JP) ................................. 2020-065941

(51) Int. Cl.
  *G01N 15/14* (2024.01)
  *G01N 15/1434* (2024.01)
  *G01N 15/10* (2006.01)

(52) U.S. Cl.
  CPC ..... *G01N 15/1459* (2013.01); *G01N 15/1434* (2013.01); *G01N 2015/1006* (2013.01); *G01N 2015/144* (2013.01)

(58) Field of Classification Search
  CPC ........... G01N 15/1459; G01N 15/1434; G01N 2015/1006; G01N 2015/144
  See application file for complete search history.

(56) References Cited

U.S. PATENT DOCUMENTS 4,537,861 A    8/1985  Elings et al.
5,007,737 A    4/1991  Hirleman, Jr.
(Continued)

FOREIGN PATENT DOCUMENTS

CN    1302229 A    7/2001
CN    1330151 A    1/2002
(Continued)

OTHER PUBLICATIONS

Byounghyo Lee, Jong-Young Hong, Dongheon Yoo, Jaebum Cho, Youngmo Jeong, Seokil Moon, Byoungho Lee, "Single-shot phaseretrieval via Fourier ptychographic microscopy", Optica, Optical Society of America, vol. 5, No. 8, p. 976, Aug. 2018.
(Continued)

*Primary Examiner* — Jamil Ahmed
(74) *Attorney, Agent, or Firm* — WILSON SONSINI GOODRICH & ROSATI

(57) ABSTRACT

An observation device includes an illumination optical system and an observation optical system. The illumination optical system includes a light source and an aperture member. The observation optical system includes an objective lens, an optical structure, and a detector. The optical structure is disposed at a first position which is the position conjugate with the aperture member. The optical structure includes a blocking portion that blocks light and a transmitting portion that transmits light, the blocking portion having a shape including the shape of an image of an aperture of the aperture member which is formed on the optical structure. The detector detects dark-field light passing through the optical structure.

21 Claims, 14 Drawing Sheets

(56) References Cited

U.S. PATENT DOCUMENTS

| | | | |
|---|---|---|---|
| 5,017,497 A | 5/1991 | Gerard De Grooth et al. | |
| 5,483,469 A | 1/1996 | Van Den Engh et al. | |
| 6,064,473 A | 5/2000 | Hironaga et al. | |
| 6,249,341 B1 | 6/2001 | Basiji et al. | |
| 6,956,230 B1 | 10/2005 | Gharib et al. | |
| 7,012,738 B1 | 3/2006 | Schwarte | |
| 7,217,573 B1 | 5/2007 | Oshida et al. | |
| 7,812,303 B2 | 10/2010 | Meyers et al. | |
| 8,314,933 B2 | 11/2012 | Cui et al. | |
| 8,582,203 B2 | 11/2013 | Dunsby | |
| 9,069,175 B2 | 6/2015 | Koebler et al. | |
| 9,134,242 B2 | 9/2015 | Shaffer et al. | |
| 9,360,660 B2 | 6/2016 | Yi et al. | |
| 9,518,916 B1 | 12/2016 | Pandev et al. | |
| 9,645,377 B2 | 5/2017 | Bosworth et al. | |
| 9,915,598 B2 | 3/2018 | Kim et al. | |
| 10,646,160 B2 | 5/2020 | Yelin et al. | |
| 10,761,011 B2 | 9/2020 | Ota et al. | |
| 10,904,415 B2 | 1/2021 | Horisaki et al. | |
| 11,054,363 B2 | 7/2021 | Ota et al. | |
| 11,098,275 B2 | 8/2021 | Ota et al. | |
| 11,412,118 B2 | 8/2022 | Horisaki et al. | |
| 11,542,461 B2 | 1/2023 | Ota et al. | |
| 11,549,880 B2 | 1/2023 | Horisaki et al. | |
| 11,579,075 B2 | 2/2023 | Ota et al. | |
| 11,630,293 B2 | 4/2023 | Ugawa et al. | |
| 11,788,948 B2 | 10/2023 | Ota et al. | |
| 11,861,889 B2 | 1/2024 | Ota et al. | |
| 11,867,610 B2 | 1/2024 | Ota et al. | |
| 11,906,722 B2 | 2/2024 | Horisaki et al. | |
| 2002/0041376 A1 | 4/2002 | Kurozumi et al. | |
| 2003/0142289 A1 | 7/2003 | Ortyn et al. | |
| 2003/0162218 A1 | 8/2003 | Emalfarb et al. | |
| 2004/0061914 A1 | 4/2004 | Miyawaki et al. | |
| 2004/0189977 A1 | 9/2004 | Nagai et al. | |
| 2005/0002030 A1 | 1/2005 | Kolp et al. | |
| 2005/0046849 A1 | 3/2005 | Cromwell et al. | |
| 2005/0051466 A1 | 3/2005 | Carter et al. | |
| 2007/0091315 A1 | 4/2007 | Brady et al. | |
| 2007/0151343 A1 | 7/2007 | Gross et al. | |
| 2008/0195020 A1* | 8/2008 | Cabuz | F16K 99/0015 604/4.01 |
| 2008/0214412 A1 | 9/2008 | Stahler et al. | |
| 2009/0071225 A1 | 3/2009 | Schilffarth | |
| 2009/0093807 A1 | 4/2009 | Hyde et al. | |
| 2009/0153883 A1 | 6/2009 | Shinoda | |
| 2009/0190121 A1 | 7/2009 | Hegyi et al. | |
| 2009/0194702 A1 | 8/2009 | Meyers et al. | |
| 2009/0248318 A1 | 10/2009 | Nagai et al. | |
| 2009/0290156 A1 | 11/2009 | Popescu et al. | |
| 2010/0170796 A1 | 7/2010 | Bhatia et al. | |
| 2010/0284016 A1 | 11/2010 | Teitell et al. | |
| 2010/0294916 A1 | 11/2010 | Meyers et al. | |
| 2012/0001090 A1 | 1/2012 | Takasaki et al. | |
| 2012/0004514 A1 | 1/2012 | Marugame | |
| 2012/0069170 A1 | 3/2012 | Gesley | |
| 2012/0122084 A1 | 5/2012 | Wagner et al. | |
| 2012/0128264 A1 | 5/2012 | Yazdanfar et al. | |
| 2012/0200857 A1 | 8/2012 | Sharpe et al. | |
| 2012/0204628 A1 | 8/2012 | Wagner et al. | |
| 2013/0016335 A1 | 1/2013 | Lo et al. | |
| 2013/0078733 A1 | 3/2013 | Holmes et al. | |
| 2013/0102865 A1 | 4/2013 | Mandelis et al. | |
| 2013/0155499 A1 | 6/2013 | Dixon | |
| 2013/0163844 A1 | 6/2013 | Ozaki et al. | |
| 2013/0176533 A1 | 7/2013 | Raffle et al. | |
| 2013/0200277 A1 | 8/2013 | Li et al. | |
| 2013/0202151 A1 | 8/2013 | Dauwels et al. | |
| 2013/0204538 A1 | 8/2013 | Rich | |
| 2013/0308122 A1 | 11/2013 | Merchez et al. | |
| 2013/0329226 A1 | 12/2013 | Matsubara et al. | |
| 2014/0073000 A1 | 3/2014 | Sun et al. | |
| 2014/0078352 A1 | 3/2014 | Iwai | |
| 2014/0098359 A1 | 4/2014 | Gross et al. | |
| 2014/0152801 A1 | 6/2014 | Fine et al. | |
| 2014/0236494 A1 | 8/2014 | Kolandaivelu et al. | |
| 2014/0293281 A1 | 10/2014 | Yamamoto et al. | |
| 2014/0323325 A1 | 10/2014 | Beal et al. | |
| 2014/0353522 A1 | 12/2014 | Wu et al. | |
| 2014/0376816 A1 | 12/2014 | Lagae et al. | |
| 2015/0182178 A1 | 7/2015 | Baturin et al. | |
| 2015/0192767 A1 | 7/2015 | Li et al. | |
| 2015/0198584 A1 | 7/2015 | Rajwa et al. | |
| 2015/0233703 A1 | 8/2015 | Martini et al. | |
| 2015/0268244 A1 | 9/2015 | Cho et al. | |
| 2015/0276387 A1 | 10/2015 | Kletter et al. | |
| 2015/0377783 A1 | 12/2015 | Kumer | |
| 2016/0026900 A1 | 1/2016 | Ando | |
| 2016/0033328 A1 | 2/2016 | Walters | |
| 2016/0046958 A1 | 2/2016 | Eberwine et al. | |
| 2016/0069919 A1 | 3/2016 | Holmes et al. | |
| 2016/0125615 A1 | 5/2016 | Shigaki et al. | |
| 2016/0131891 A1 | 5/2016 | Higaki | |
| 2016/0169786 A1 | 6/2016 | Albitar et al. | |
| 2016/0223453 A1 | 8/2016 | Jalali et al. | |
| 2016/0231549 A1 | 8/2016 | Bosworth et al. | |
| 2016/0258856 A1 | 9/2016 | Kim et al. | |
| 2016/0258901 A1 | 9/2016 | Kang et al. | |
| 2016/0327779 A1 | 11/2016 | Hillman et al. | |
| 2016/0370266 A1 | 12/2016 | White et al. | |
| 2017/0045437 A1 | 2/2017 | Ishimaru | |
| 2017/0045451 A1 | 2/2017 | Nolan et al. | |
| 2017/0052106 A1 | 2/2017 | Hennig et al. | |
| 2017/0058361 A1 | 3/2017 | Ogawa et al. | |
| 2017/0082531 A1 | 3/2017 | Okada et al. | |
| 2017/0184483 A1 | 6/2017 | Bartels et al. | |
| 2017/0212028 A1 | 7/2017 | Correia De Matos Nolasco Lamas et al. | |
| 2017/0221194 A1 | 8/2017 | Ebstein | |
| 2017/0227466 A1 | 8/2017 | Lo et al. | |
| 2017/0322137 A1 | 11/2017 | Feher et al. | |
| 2017/0328826 A1 | 11/2017 | Diebold et al. | |
| 2017/0332933 A1 | 11/2017 | Krishnaswamy et al. | |
| 2018/0052154 A1 | 2/2018 | Stoner et al. | |
| 2018/0127823 A1 | 5/2018 | Shekhar et al. | |
| 2018/0246030 A1 | 8/2018 | Ota et al. | |
| 2018/0251833 A1 | 9/2018 | Daugharthy et al. | |
| 2018/0327699 A1 | 11/2018 | Ota et al. | |
| 2019/0005351 A1 | 1/2019 | Zhou et al. | |
| 2019/0339380 A1 | 11/2019 | Marks | |
| 2019/0355440 A1 | 11/2019 | Ramjeet et al. | |
| 2019/0383719 A1 | 12/2019 | Corbett et al. | |
| 2020/0027020 A1 | 1/2020 | Kamesawa et al. | |
| 2021/0080382 A1 | 3/2021 | Alfano et al. | |
| 2021/0161385 A1 | 6/2021 | Ben-Yakar et al. | |
| 2021/0190669 A1 | 6/2021 | Ota et al. | |
| 2021/0310053 A1 | 10/2021 | Sugimoto | |
| 2022/0317020 A1 | 10/2022 | Nakagawa | |
| 2023/0090631 A1 | 3/2023 | Imai et al. | |
| 2023/0237789 A1 | 7/2023 | Ota et al. | |
| 2024/0133792 A1 | 4/2024 | Ota et al. | |
| 2024/0241038 A1 | 7/2024 | Ota et al. | |
| 2024/0303980 A1 | 9/2024 | Ota et al. | |

FOREIGN PATENT DOCUMENTS

| | | |
|---|---|---|
| CN | 101320252 A | 12/2008 |
| CN | 101714212 A | 5/2010 |
| CN | 101925809 A | 12/2010 |
| CN | 101939633 A | 1/2011 |
| CN | 102272580 A | 12/2011 |
| CN | 102331411 A | 1/2012 |
| CN | 102495467 A | 6/2012 |
| CN | 102890049 A | 1/2013 |
| CN | 103582809 A | 2/2014 |
| CN | 103604737 A | 2/2014 |
| CN | 103837461 A | 6/2014 |
| CN | 103930768 A | 7/2014 |
| CN | 103942415 A | 7/2014 |
| CN | 104136907 A | 11/2014 |
| CN | 104154878 A | 11/2014 |
| CN | 104200114 A | 12/2014 |
| CN | 104736995 A | 6/2015 |

(56) References Cited

FOREIGN PATENT DOCUMENTS

| | | |
|---|---|---|
| CN | 104849874 A | 8/2015 |
| CN | 105005053 A | 10/2015 |
| CN | 105044897 A | 11/2015 |
| CN | 105181649 A | 12/2015 |
| CN | 105223582 A | 1/2016 |
| CN | 105574536 A | 5/2016 |
| CN | 105579828 A | 5/2016 |
| CN | 105651656 A | 6/2016 |
| CN | 105849275 A | 8/2016 |
| CN | 106068520 A | 11/2016 |
| CN | 106097437 A | 11/2016 |
| CN | 106267241 A | 1/2017 |
| CN | 106295251 A | 1/2017 |
| CN | 106520535 A | 3/2017 |
| CN | 109297888 A | 2/2019 |
| EP | 2602612 A1 | 6/2013 |
| EP | 2673618 A1 | 12/2013 |
| EP | 3264031 A1 | 1/2018 |
| EP | 3372985 A1 | 9/2018 |
| EP | 3499201 A1 | 6/2019 |
| EP | 3584564 A1 | 12/2019 |
| EP | 3807005 A1 | 4/2021 |
| EP | 4306931 A2 | 1/2024 |
| JP | S613032 A | 1/1986 |
| JP | S6279329 A | 4/1987 |
| JP | H01118747 A | 5/1989 |
| JP | H03216553 A | 9/1991 |
| JP | H06102152 A | 4/1994 |
| JP | H07270302 A | 10/1995 |
| JP | H07270314 A | 10/1995 |
| JP | H07325026 A | 12/1995 |
| JP | H09311102 A | 12/1997 |
| JP | 2002116133 A | 4/2002 |
| JP | 3444509 B2 | 9/2003 |
| JP | 2003526091 A | 9/2003 |
| JP | 2004150832 A | 5/2004 |
| JP | 2004279032 A | 10/2004 |
| JP | 2004286731 A | 10/2004 |
| JP | 2005069832 A | 3/2005 |
| JP | 2006520893 A | 9/2006 |
| JP | 2007048172 A | 2/2007 |
| JP | 2007281634 A | 10/2007 |
| JP | 2008523402 A | 7/2008 |
| JP | 2008539425 A | 11/2008 |
| JP | 2009115672 A | 5/2009 |
| JP | 2009180724 A | 8/2009 |
| JP | 2009180725 A | 8/2009 |
| JP | 2009210465 A | 9/2009 |
| JP | 2010203949 A | 9/2010 |
| JP | 4679507 B2 | 4/2011 |
| JP | 2011099848 A | 5/2011 |
| JP | 2011141444 A * | 7/2011 ............ G02B 21/30 |
| JP | 2011229409 A | 11/2011 |
| JP | 2011229410 A | 11/2011 |
| JP | 2012500385 A | 1/2012 |
| JP | 2013015357 A | 1/2013 |
| JP | 2013128438 A | 7/2013 |
| JP | 2013167582 A | 8/2013 |
| JP | 2013178232 A | 9/2013 |
| JP | 2013210287 A | 10/2013 |
| JP | 2014013234 A | 1/2014 |
| JP | 5418386 B2 | 2/2014 |
| JP | 5464244 B2 | 4/2014 |
| JP | 5534214 B2 | 6/2014 |
| JP | 5574407 B2 | 8/2014 |
| JP | 2014175819 A | 9/2014 |
| JP | 2014190748 A | 10/2014 |
| JP | 2015036799 A | 2/2015 |
| JP | 2015052663 A | 3/2015 |
| JP | 2015512029 A | 4/2015 |
| JP | 2016057172 A | 4/2016 |
| JP | 2016510418 A | 4/2016 |
| JP | 2016073210 A | 5/2016 |
| JP | 2016090292 A | 5/2016 |
| JP | 2016099685 A | 5/2016 |
| JP | 2016517526 A | 6/2016 |
| JP | 2016524703 A | 8/2016 |
| JP | 2016192007 A | 11/2016 |
| JP | 2017058361 A | 3/2017 |
| JP | 2018511060 A | 4/2018 |
| JP | 2018132501 A | 8/2018 |
| JP | WO2018181458 A1 | 2/2020 |
| WO | WO-03048345 A1 | 6/2003 |
| WO | WO-2006080314 A1 | 8/2006 |
| WO | WO-2006103920 A1 | 10/2006 |
| WO | WO-2006115663 A2 | 11/2006 |
| WO | WO-2006127967 A2 | 11/2006 |
| WO | WO-2007067999 A2 | 6/2007 |
| WO | WO-2010017001 A2 | 2/2010 |
| WO | WO-2010032452 A1 | 3/2010 |
| WO | WO-2011028109 A1 | 3/2011 |
| WO | WO-2011049965 A1 | 4/2011 |
| WO | WO-2012068287 A2 | 5/2012 |
| WO | WO-2012086195 A1 | 6/2012 |
| WO | WO-2012144886 A1 | 10/2012 |
| WO | WO-2012147804 A1 | 11/2012 |
| WO | WO-2013066896 A1 | 5/2013 |
| WO | WO-2013101675 A2 | 7/2013 |
| WO | WO-2014127379 A1 | 8/2014 |
| WO | WO-2014144585 A1 | 9/2014 |
| WO | WO-2014146062 A2 | 9/2014 |
| WO | WO-2015067734 A1 | 5/2015 |
| WO | WO-2015068834 A1 | 5/2015 |
| WO | WO-2015148560 A1 | 10/2015 |
| WO | WO-2016038796 A1 | 3/2016 |
| WO | WO-2016073985 A1 | 5/2016 |
| WO | WO-2016085571 A2 | 6/2016 |
| WO | WO-2016130489 A1 | 8/2016 |
| WO | WO-2016136801 A1 | 9/2016 |
| WO | WO-2017046988 A1 | 3/2017 |
| WO | WO-2017073737 A1 | 5/2017 |
| WO | WO-2017121896 A1 | 7/2017 |
| WO | WO-2017164936 A1 | 9/2017 |
| WO | WO-2018034241 A1 | 2/2018 |
| WO | WO-2018126205 A1 | 7/2018 |
| WO | WO-2018151206 A1 | 8/2018 |
| WO | WO-2018199080 A1 | 11/2018 |
| WO | WO-2019241443 A1 | 12/2019 |
| WO | WO-2020081819 A1 | 4/2020 |
| WO | WO-2021132484 A1 | 7/2021 |
| WO | WO-2021200911 A1 | 10/2021 |
| WO | WO-2021200960 A1 | 10/2021 |

OTHER PUBLICATIONS

PCT/JP2021/013564 International Search Report dated Jun. 22, 2021.
Ziji Liu, Lei Tian, Sijia Liu, Laura Waller, "Real-time brightfield, darkfield, and phasecontrast imaging in a light-emitting diode array microscope", Journal of BiomedicalOptics, SPIE, the international society for optics and photonic, 19(10), p. 106002,Oct. 1, 2014.
U.S. Appl. No. 18/238,368 Notice of Allowance dated Dec. 11, 2024.
U.S. Appl. No. 18/512,356 Office Action dated Dec. 12, 2024.
Abolbashari, Mehrdad, et al. High dynamic range compressive imaging: a programmable imaging system. Optical Engineering, vol. 51, No. 7, 071407-1-071407-8 (2012).
Adachi, Hioraki, et al. Use of Ghost Cytometry to Differentiate Cells with Similar Gross Morphologic Characteristics. ARXIV.Org., 1-11, (2019).
Adjouadi, Malek et al. Multidimensional Pattern Recognition and Classification of White Blood Cells Using Support Vector Machines. Particle & Particle Systems Characterization 22(2):107-118 (2005).
Baroud, Charles N., et al. Dynamics of microfluidic droplets. Lab on a Chip, vol. 10, 2032-2045 (2010).
Bruggner, Robert V. et al. Automated Identification of Stratifying Signatures in Cellular Subpopulations. Proceedings of the National Academy of Sciences 111(26):E2770-E2777 (2014).
Choi, Kerkil, et al. Compressive holography of diffuse objects. Applied Optics, vol. 49, No. 34, 1-10 (2010).

(56) References Cited

OTHER PUBLICATIONS

CN201680011390.X Office Action dated Apr. 9, 2020, and an English translation.
CN201680011390.X Office Action dated Nov. 29, 2019, and an English translation.
CN201680011390.X Office Action with Search Report dated Mar. 1, 2019, and a partial English translation.
CN201680062987.7 Office Action dated Dec. 30, 2019.
CN201680062987.7 Office Action with Search Report dated Dec. 30, 2019, and a Partial English translation.
CN201680062987.7 Office Action with Search Report dated Mar. 11, 2021, and a Partial English translation.
CN201680062987.7 Office Action with Search Report dated Sep. 10, 2020, and a Partial English translation.
CN201780062816.9 Office Action dated Jul. 17, 2020.
CN201880012120.X Office Action dated Dec. 23, 2021.
CN201880021362.5 Chinese Office Action with Search Report dated Mar. 31, 2023.
CN201980053558.7 Office Action dated Aug. 23, 2022, and an English translation.
CN201980053558.7 Office Action with Search report dated Dec. 2, 2021, and a partial English translation.
CN202111319130.8 Search Report dated Dec. 27, 2023.
Duarte, Marco, et al. Single-Pixel Imaging via Compressive Sampling. IEEE Signal Processing Magazine, vol. 25, 83-91 (2008).
EP16755545.7 Office Action dated Jun. 24, 2020.
EP16859965.2 European Search Report dated Aug. 16, 2019.
EP16859965.2 Office Action dated Jul. 18, 2022.
EP17841464.5 Extended European Search Report dated Jan. 28, 2020.
EP18753550.5 Extended European Search Report dated Feb. 19, 2020.
EP18775495.7 Extended Search Report dated Dec. 18, 2020.
EP19819019.1 Extended European Search Report dated Feb. 8, 2022.
EP19873817.1 Extended European Search Report dated Jul. 15, 2022.
EP20160755545.7 Extended European Search Report dated Aug. 24, 2018.
EP20160859965.2 Partial European Search Report dated May 6, 2019.
EP20907648.8 Partial Supplementary European Search Report dated Dec. 14, 2023.
EP21779172.2 European Supplementary Search Report dated Mar. 14, 2024.
EP23195563.4 Extended European Search Report dated Jan. 9, 2024.
Han, Yuanyuan, et al. Imaging Cells in Flow Cytometer Using Spatial-Temporal Transformation. Scientific Reports 5:13267, 1-10 (2015).
Hassan, S. Sakira, et. al. Flow Cytometry-Based Classification in Cancer Research: A View on Feature Selection, Cancer Informatics, vol. 14, 75-85 (2015).
Hennig, Holger, et. al. An open-source solution for advanced imaging flow cytometry data analysis using machine learning. Methods, vol. 112, 201-210 (2017).
Horisaki, Ryoichi, et al. Single-pixel compressive diffractive imaging. Applied Optics, vol. 56, No. 5, 1353-1357 (2017).
Horisaki, Ryoichi, et al. Single-pixel compressive diffractive imaging with structured illumination. Applied Optics, vol. 56 No. 14, 4085-4089 (2017).
Horisaki, Ryoichi, et al. Single-shot phase imaging with a coded aperture. Optics Letters, vol. 39, No. 22, 1-4 (2014).
Joung, Julia, et al. Genome-scale CRISPR-Cas9 Knockout and Transcriptional Activation Screening. Nature Protocols, vol. 12, 828-863 (2017).
JP2017_502419 Office Action dated Aug. 21, 2018, and an English translation.
JP2017_502419 Office Action dated May 7, 2019, and an English translation.
JP2017_547891 Office Action dated Apr. 27, 2021, and an English translation.
JP2017_547891 Office Action dated Aug. 31, 2021, and an English translation.
JP2017_547891 Office Action dated Oct. 6, 2020, and an English translation.
JP2019-514527 Decision of Dismissal of Amendment dated Jul. 12, 2022.
JP2020-170808 Office Action dated Sep. 21, 2021.
JP2021-159163 Office Action dated Oct. 4, 2022.
JP2021_518859 Office Action dated Jun. 5, 2023, and an English translation.
JP2021_518859 Office Action dated Sep. 4, 2023, and an English translation.
JP2021_521403 Office Action dated May 7, 2024, and an English translation.
JP2021_521403 Office Action dated Sep. 4, 2023, and an English translation.
JP2021_567626 Office Action dated May 7, 2024, and an English translation.
JP2022-170844 Office Action dated Aug. 22, 2023.
JP2023_172195 Office Action dated Jun. 10, 2024, and an English translation.
Katkovnik, Vladimir, et al. Compressive sensing computational ghost imaging, 1-62 (2012). Retrieved from: https://pdfs.semanticscholar.org/4568/1fbc1143924f13c1800b8c1008be6c1241d8.pdf.
Katkovnik, Vladimir, et al. Compressive sensing computational ghost imaging. Journal of the Optical Society of America, vol. 29, No. 8, 1556-1567 (2012).
Katkovnik, Vladimir, et al. Phase retrieval via spatial light modulator phase modulation in 4f optical setup: numerical inverse imaging with sparse regularization for phase and amplitude. Journal of the Optical Society of America, vol. 29, No. 1, 105-116 (2012).
Katz, Ori, et al. Compressive ghost imaging. Applied Physics Letters, vol. 95, 2-5 (2009).
Krstenansky, John L., et al. Short model peptides having a high alpha-helical tendency: design and solution properties. Federation of European Biochemical Societies, vol. 242, No. 2, 409-413 (1989).
Lee, Gyemin, et al. Transfer Learning for Auto-gating of Flow Cytometry Data, JMLR: Workshop and Conference Proceedings, Workshop on Unsupervised and Transfer Learning, vol. 27, 155-165 (2012).
Li, Enrong et al. Ghost Imaging of a Moving Target With an Unknown Constant Speed. Applied Physics Letters 104:251120-1-251120-3 (2014).
Li, Xiaohui, et al. Ghost imaging for an axially moving target with an unknown constant speed. Photonics Research, vol. 3, No. 4, 153-157 (2015).
Liutkus, Antoine, et al. Imaging With Nature: A Universal Analog Compressive Imager Using a Multiply Scattering Medium. Retrieved from: http://arxiv.org/vc/arxiv/papers/1309/1309.0425v1.pdf, arXiv.org, 1-15 (2013).
Liutkus, Antoine, et al. Imaging With Nature: Compressive Imaging Using a Multiply Scattering Medium. Scientific Reports, vol. 4, 1-13 (2014).
Mair, Florian et al. The End of Gating? An Introduction to Automated Analysis of High Dimensional Cytometry Data. European Journal of Immunology 46(1):34-43 (2016). Published Online Nov. 30, 2015.
Meehan, Stephen et al. AutoGate: Automating Analysis of Flow Cytometry Data. Immunologic Research 58(2-3):218-223 (2014).
Ni, Wanmao, et. al. Discrimination of malignant neutrophils of chronic myelogenous leukemia from normal neutrophils by support vector machine. Computers in Biology and Medicine, vol. 43, 1192-1195 (2013).
Nitta, Nao et al. Intelligent Image-Activated Cell Sorting. Cell 175(1):266-276.e1-e13 (2018).
Ota, Sadao, et al. Ghost Cytometry. Science, vol. 360, 1246-1251 (2018).
PCT/JP2016/055412 International Search Report and Written Opinion dated May 17, 2016.

(56) References Cited

OTHER PUBLICATIONS

PCT/JP2016/082089 International Search Report and Written Opinion dated Jan. 24, 2017.
PCT/JP2017/029156 International Search Report dated Oct. 31, 2017.
PCT/JP2018/005237 International Search Report dated May 1, 2018.
PCT/JP2018/012708 International Search Report and Witten opinion dated Jul. 3, 2018.
PCT/JP2018/016584 International Search Report dated Jul. 17, 2018.
PCT/JP2020/048503 International Preliminary Report on Patentability dated Jul. 7, 2022.
PCT/JP2020/048503 International Search Report dated Mar. 9, 2021.
PCT/JP2021/013478 International Preliminary Report on Patentability dated Oct. 13, 2022.
PCT/JP2021/013478 International Search Report dated Jun. 22, 2021.
PCT/US2019/036849 International Search Report and Written Opinion dated Sep. 19, 2019.
PCT/US2019/056743 International Search Report and Written Opinion dated Feb. 7, 2020.
Pian, Qi, et al. Time-resolved Hyperspectral Single-pixel Camera Implementation for Compressive Wide-Field Fluorescence Lifetime Imaging. Proceedings of the International Society for Optical Engineering, vol. 9701, 970115-1-970115-6 (2016).
Rajwa, Bartek et al. Automated Classification of Bacterial Particles in Flow by Multiangle Scatter Measurement and Support Vector Machine Classifier. Cytometry Part A, vol. 73A, Issue 4, 369-379 (2008).
Rota, Paolo, et. al. The Role of Machine Learning in Medical Data Analysis. A Case Study: Flow Cytometry. Proceedings of the 11th Joint Conference on Computer Vision, Imaging and Computer Graphics Theory and Applications, vol. 3, 305-312 (2016).
Shalem, Ophir, et al. Genome-Scale CRISPR-Cas9 Knockout Screening in Human Cells. Science, vol. 343, 84-87 (2014).
Shibuya, Kyuki, et al. Monomolecular fluorescence imaging method based on ghost imaging by using circulatory pattern (second report). Proceedings of Japan Science and Technology Agency, Semestrial Meeting, 863-864 (2014).
Sosik, Heidi M., et. al. Automated taxonomic classification of phytoplankton sampled with imaging-in-flow cytometry. Limnology and Oceanography: Methods, vol. 5, 204-216 (2007).
Tsujioka, Katsumi, et al. Three-dimensional shape measurement system using optical spatial modulator and zoom camera. Fifth International Symposium on Instrumentation and Control Technology, vol. 5253, 504-507 (2003).
Ugawa, Masashi, et al. High-throughput optofluidic particle profiling with morphological and chemical specificity. Optics Letters, vol. 40, No. 20, 4803-4806 (2015).
U.S. Appl. No. 15/552,438 Notice of Allowance dated Jul. 17, 2020.
U.S. Appl. No. 15/552,438 Notice of Allowance dated Jun. 16, 2020.
U.S. Appl. No. 15/552,438 Office Action dated Apr. 12, 2019.
U.S. Appl. No. 15/552,438 Office Action dated Aug. 9, 2018.
U.S. Appl. No. 15/552,438 Office Action dated Nov. 12, 2019.
U.S. Appl. No. 15/771,180 Corrected Notice of Allowability dated Jul. 21, 2021.
U.S. Appl. No. 15/771,180 Notice of Allowance dated May 17, 2021.
U.S. Appl. No. 15/771,180 Office Action dated Apr. 23, 2019.
U.S. Appl. No. 15/771,180 Office Action dated Jul. 30, 2020.
U.S. Appl. No. 15/771,180 Office Action dated Jun. 8, 2020.
U.S. Appl. No. 15/771,180 Office Action dated Nov. 13, 2019.
U.S. Appl. No. 16/272,569 Notice of Allowance dated Aug. 12, 2020.
U.S. Appl. No. 16/272,569 Office Action dated Apr. 16, 2020.
U.S. Appl. No. 16/542,257 Notice of Allowance dated Aug. 30, 2022.
U.S. Appl. No. 16/542,257 Notice of Allowance dated Nov. 17, 2022.
U.S. Appl. No. 16/542,257 Office Action dated Nov. 16, 2021.
U.S. Appl. No. 16/584,535 Office Action dated Aug. 21, 2024.
U.S. Appl. No. 16/584,535 Office Action dated Dec. 4, 2023.
U.S. Appl. No. 16/584,535 Office Action dated Feb. 18, 2022.
U.S. Appl. No. 16/584,535 Office Action dated Jun. 14, 2023.
U.S. Appl. No. 16/584,535 Office Action dated Sep. 12, 2022.
U.S. Appl. No. 16/663,182 Notice of Allowance dated Dec. 15, 2022.
U.S. Appl. No. 16/663,182 Notice of Allowance dated Jan. 11, 2023.
U.S. Appl. No. 16/663,182 Office Action dated Apr. 27, 2022.
U.S. Appl. No. 16/936,138 Notice of Allowance dated Apr. 14, 2021.
U.S. Appl. No. 16/936,138 Notice of Allowance dated Jun. 8, 2021.
U.S. Appl. No. 16/936,138 Office Action dated Oct. 22, 2020.
U.S. Appl. No. 17/089,028 Notice of Allowance dated Apr. 19, 2022.
U.S. Appl. No. 17/089,028 Office Action dated Nov. 24, 2021.
U.S. Appl. No. 17/115,657 Notice of Allowance dated Aug. 4, 2023.
U.S. Appl. No. 17/115,657 Notice of Allowance dated Jun. 14, 2023.
U.S. Appl. No. 17/115,657 Office Action dated Jan. 20, 2023.
U.S. Appl. No. 17/231,725 Office Action dated Aug. 27, 2024.
U.S. Appl. No. 17/231,725 Office Action dated Feb. 26, 2024.
U.S. Appl. No. 17/336,720 Notice of Allowance dated Oct. 27, 2022.
U.S. Appl. No. 17/336,720 Office Action dated Apr. 14, 2022.
U.S. Appl. No. 17/351,117 Corrected Notice of Allowability dated Nov. 28, 2022.
U.S. Appl. No. 17/351,117 Corrected Notice of Allowability dated Sep. 23, 2022.
U.S. Appl. No. 17/351,117 Notice of Allowance dated Sep. 15, 2022.
U.S. Appl. No. 17/351,117 Office Action dated Apr. 22, 2022.
U.S. Appl. No. 17/847,478 Corrected Notice of Allowability dated Nov. 18, 2024.
U.S. Appl. No. 17/847,478 Notice of Allowance dated Nov. 6, 2024.
U.S. Appl. No. 17/847,478 Office Action dated May 15, 2024.
U.S. Appl. No. 17/935,696 Office Action dated Jun. 6, 2024.
U.S. Appl. No. 18/056,432 Notice of Allowance dated Oct. 18, 2023.
U.S. Appl. No. 18/056,432 Office Action dated May 9, 2023.
U.S. Appl. No. 18/059,846 Notice of Allowance dated Aug. 22, 2023.
U.S. Appl. No. 18/059,846 Notice of Allowance dated Sep. 6, 2023.
U.S. Appl. No. 18/059,846 Office Action dated May 17, 2023.
U.S. Appl. No. 18/152,354 Notice of Allowance dated Aug. 23, 2023.
U.S. Appl. No. 18/152,354 Office Action dated Jul. 3, 2023.
U.S. Appl. No. 18/238,368 Notice of Allowance dated Apr. 3, 2024.
U.S. Appl. No. 18/238,368 Office Action dated Aug. 15, 2024.
U.S. Appl. No. 18/511,920 Notice of Allowance dated Oct. 18, 2024.
U.S. Appl. No. 18/511,920 Office Action dated Jul. 5, 2024.
U.S. Appl. No. 18/512,356 Office Action dated May 28, 2024.
Van Meir, Erwin G., et al. Single cell monitoring of growth arrest and morphological changes induced by transfer of wild-type p53 alleles to glioblastoma cells. Proceedings of the National Academy of Science, Genetics, vol. 92, 1008-1012 (1995).
Voigt, Andrew P. et al. Consistent Quantitative Gene Product Expression:# 1. Automated Identification of Regenerating Bone Marrow Cell Populations Using Support Vector Machines. Cytometry Part A 89(11):978-986 (2016).
Wang, Xianwen. Research on Automatic Identification Algorithm of Cell Groups in Flow cytometry Data Based on Skew T-Hybrid Model. China Doctoral Dissertation Full text Database Information Technology Edition, vol. 11, 1-123 (2015).
Wu, Jiani. Analysis of High Dimentional Mass Cytometry Data Based on Support Vector Machine and Its Application in the Early Diagnosis of Acute Myelocytic Leukemia. Chinese Thesis for Master Degree Full Text Database, Medical and Health Technology Edition, No. 1, 1-79 (2016).

(56) References Cited

OTHER PUBLICATIONS

Wu, Jianjun, et al. Expression of an exogenous eukaryotic DNA methyltransferase gene induces transformation of NIH 3T3 cells. Proceedings of the National Academy of Science, Medical Sciences, vol. 90, 8891-8895 (1993).
Zhang, Leihong, et al. Study on Ghost Imaging via Compressive Sensing for a Reflected Object. Optik 124(16):2334-2338 (2013).
Zhou et al., Focusing on moving targets through scattering samples, 2014, Optica, vol. 1(4); pp. 227-232.
JP2023-172195 Notice of Allowance dated Dec. 16, 2024, and an English translation.
Van Der Pol, Edwin., et al. Absolute sizing and label-free identification of extracellular vesicles by flow cytometry. Nanomedicine 14(3):801-810 (2018).

* cited by examiner

OBSERVATION DEVICE

CROSS-REFERENCE

The present application is a continuation application of International Application No. PCT/JP2021/013564, filed Mar. 30, 2021, which claims priority to Japanese Patent Application No. 2020-065941, filed on Apr. 1, 2020, each of which is entirely incorporated herein by reference.

TECHNICAL FIELD

The present invention relates to an observation device.

BACKGROUND ART

A flow cytometer is an analysis device using a technique called flow cytometry of dispersing individual cells in a fluid and optically analyzing the fluid while causing the fluid to flow finely. The flow cytometer is a cytometry technique which is mainly used to individually observe cells. With activation of movement to commercialization of new therapy techniques such as regenerative medicine using stem cells such as induced pluripotent stem cells (iPS cells) or immunotherapy using chimeric antigen receptor T cells (CAR-T), there is strong demand for measuring one or more cells from a cell group and analyzing individual cells. For example, in flow cytometry, an imaging cytometer that generates a two-dimensional image of cells and classifies the cells by irradiating fluorescently labeled cells with excitation light while causing the cells to flow in a flow channel and acquiring luminance of fluorescence emitted from the individual cells is known.

In this new field of therapy, there is demand for a label-free imaging means or a fluorescence imaging means that acquires morphological information in cells as richer information than that in the related art for the purpose of quality control (QC) of cells or selection of highly active cells. Examples of the rich morphological information include information obtained from an image based on multi-contrast using a difference in optical characteristics and information obtained from an image having a higher spatial resolution than that in the related art.

An imaging system using a microscope that sequentially irradiates a sample with a plurality of illumination patterns using LEDs and acquires a multimodal image through image processing is known (Non-Patent Document 1). An imaging technique using a microscope that can obtain information equivalent to irradiation with a plurality of LED patterns through one imaging process is also known (Non-Patent Document 2). On the other hand, a flow cytometer that sequentially acquires transmitted light of a sample flowing in a fluid using a structure in which a lens array or spatial filters arranged in an array shape are provided in a flow channel and a multi-sensor and acquires a two-dimensional image is known (Patent Document 1).

In the aforementioned applications, there is demand for a means enabling rapid measurement to directly contribute to improvement in productivity. A technique of directly analyzing morphological information of cells without converting measurement data thereof to a two-dimensional image has recently been developed, and ghost cytometry is known as an exemplary technique thereof. In a flow cytometer using ghost cytometry, for example, cells can be irradiated with structural illumination light and the cells can be classified directly from time-series waveforms of an acquired optical signal, and thus it is possible to provide a flow cytometer with a high speed, high sensitivity, a low cost, and a compact structure.

CITATION LIST

Patent Literature

[Patent Document 1]
 U.S. Pat. No. 8,314,933
Non-Patent Document
[Non-Patent Document 1]
 Ziji Liu, Lei Tian, Sijia Liu, Laura Waller, "Real-time brightfield, darkfield, and phase contrast imaging in a light-emitting diode array microscope," "Journal of Biomedical Optics," SPIE, the International Society for Optics and Photonic, Oct. 1, 2014, Vol. 19, No. 10, Page 106002
[Non-Patent Document 2]
 BYOUNGHYO LEE, JONG-YOUNG HONG, DONGHEON YOO, JAEBUM CHO, YOUNGMO JEONG, SEOKIL MOON, BYOUNGHO LEE, "Single-shot phase retrieval via Fourier ptychographic microscopy," "Optica," Optical Society of America, Aug. 8, 2018, Vol. 5, No. 8, Page 976

SUMMARY OF INVENTION

Technical Problem

However, in the imaging system described in Non-Patent Document 1, since a plurality of illumination patterns using LEDs need to be sequentially applied, simultaneous measurement is not possible. In the imaging technique using a microscope described in Non-Patent Document 2, since a CCD image sensor is shared, deterioration of a resolution is inevitable. In the imaging technique using a microscope described in Non-Patent Document 2, since an image needs to be reconfigured to acquire a multimodal image, image processing takes time.

On the other hand, in the flow cytometer described in Patent Document 1, types of images which can be acquired are limited to transmitted images. In the flow cytometer described in Patent Document 1, since the measuring time of a sample depends on the size of the lens array, the spatial filter, or the multi-sensor, the sizes need to be decreased for the purpose of shortening the measuring time.

As described above, in observing an observation object such as cells, there is demand for rapidly acquiring morphological information richer than that in the related art.

The present invention was made in consideration of the aforementioned circumstances and an objective thereof is to provide an observation device that can rapidly acquire richer morphological information than that in the related art in observing an observation object.

Solution to Problem

In order to achieve the above objective, according to an aspect of the present invention, there is provided an observation device including an illumination optical system and an observation optical system, wherein the illumination optical system includes a light source and an aperture member, wherein the observation optical system includes an objective lens, an optical structure, and a detector, wherein the optical structure is disposed at a first position which is conjugate with a position at which the aperture member is disposed, wherein the optical structure includes a blocking portion that blocks light and a transmitting portion that transmits light, the blocking portion having a shape including a shape of an image of an aperture of the aperture member which is formed on the optical structure, and wherein the detector detects dark-field light passing through the optical structure.

An aspect of the present invention is the observation device further including: a second optical structure including a phase changing portion that changes a phase of light and a transmitting portion that transmits light, a shape of an image of the aperture of the aperture member which is formed on the phase changing portion being a shape substantially identical to a shape of the phase changing portion; and a phase difference detector that detects a phase difference between direct light passing through the transmitting portion and diffracted light or scattered light out of the light emitted from the observation object at a position closer to the objective lens than the optical structure in an optical path between the objective lens and the detector, wherein the second optical structure is disposed at a second position which is conjugate with the position at which the aperture member is disposed and which does not correspond to the first position.

An aspect of the present invention is the observation device, wherein the observation optical system further includes a spatial modulation unit that modulates some light passing through the second optical structure and a phase-difference waveform detection system that detects light modulated by the spatial modulation unit.

An aspect of the present invention is the observation device, wherein the illumination optical system further includes an epi-fluorescence illumination optical system that irradiates the observation object with illumination light from below, and the observation optical system further includes an epi-fluorescence detector that detects fluorescence which has been generated by irradiating the observation object with the illumination light from the epi-fluorescence illumination optical system and which has passed through the optical structure.

An aspect of the present invention is the observation device further including a micro-fluid device including a flow channel in which the observation object is able to flow along with a fluid, wherein the observation optical system includes a spatial modulation unit that modulates some light passing through the optical structure and a dark-field waveform detection optical system that detects light modulated by the spatial modulation unit.

An aspect of the present invention is the observation device, wherein the detector that detects light modulated by the spatial modulation unit includes a plurality of photodetection elements, the spatial modulation unit includes a surface on which some light passing through the optical structure is incident and randomly modulates the light incident on the surface for each region included in the surface, and the plurality of photodetection elements are arranged in series in a direction in which a longitudinal direction thereof is substantially perpendicular to a direction in which an image of the observation object flowing in the flow channel moves over the detector. The spatial modulation unit may include a surface on which light passing through the optical structure is incident and randomly modulate the light incident on the surface for each region included in the surface. The detector may include a plurality of photodetection elements which are arranged in a direction in which a longitudinal direction thereof is substantially perpendicular to a direction in which an image of cells flowing in the flow channel moves over the detector.

An aspect of the present invention is the observation device, wherein the detector that detects light modulated by the spatial modulation unit includes a plurality of photodetection elements, the spatial modulation unit includes a surface on which light passing through the optical structure is incident and randomly modulates the light incident on the surface for each region included in the surface, and the plurality of photodetection elements are arranged in parallel in a direction in which a longitudinal direction thereof is substantially parallel to a direction in which an image of the observation object flowing in the flow channel moves over the detector.

An aspect of the present invention is the observation device further including a micro-fluid device including a flow channel in which the observation object is able to flow along with a fluid, wherein the detector detects some light passing through the optical structure or a second optical structure including a phase changing portion that changes a phase of light and a transmitting portion that transmits light using a plurality of photodetection elements arranged on a line, a shape of an image of the aperture of the aperture member which is formed on the phase changing portion being a shape substantially identical to a shape of the phase changing portion, and the plurality of photodetection elements are arranged on a line which is inclined by a predetermined angle with respect to the direction in which the image of the observation object flowing in the flow channel moves over the detector.

Advantageous Effects of Invention

According to the present invention, it is possible to rapidly acquire richer morphological information than that in the related art in observing an observation object. That is, according to the present invention, it is possible to simultaneously acquire phase difference information and dark field information with a high spatial resolution as morphological information on an observation object and to acquire more multifaceted information in combination with another detection method such as fluorescence detection.

DESCRIPTION OF EMBODIMENTS

First Embodiment

Figure 1:
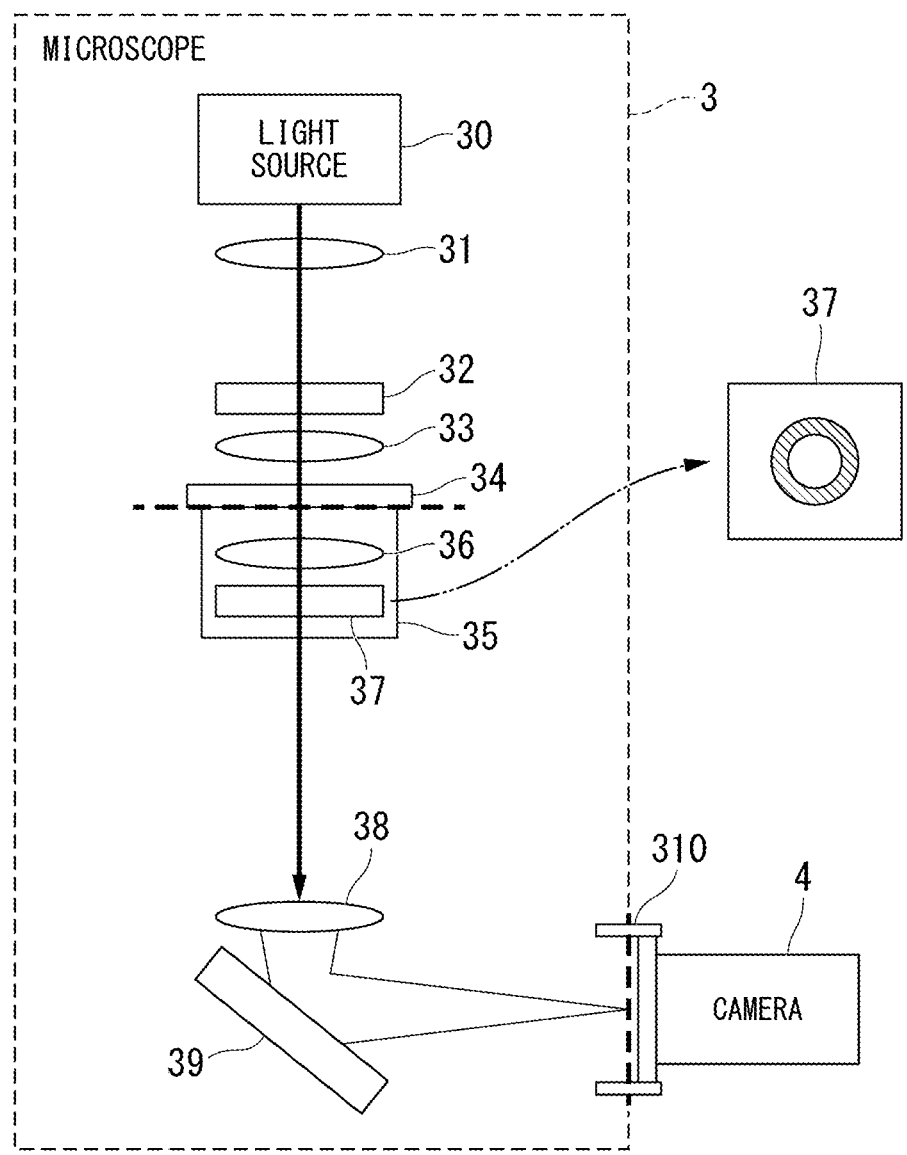
FIG. 1 is a diagram illustrating an example of a configuration of an observation device according to a first embodiment of the present invention.

Hereinafter, an embodiment of the present invention will be described in detail with reference to the accompanying drawings. FIG. 1 is a diagram illustrating an example of a configuration of an observation device D1 according to this embodiment. The observation device D1 performs dark-field image observation. The observation device D1 includes a microscope 3 and a camera 4.

The microscope 3 is an epi-fluorescence microscope device that performs a dark-field observation method. The microscope 3 includes a light source 30, a collimator 31, a slit 32, a condenser lens 33, a stage 34, an objective lens unit 35, an objective lens 36, a light blocking plate 37, an imaging lens 38, and a mirror 39. The slit 32 is an example of an aperture member.

The light source 30 emits illumination light. The light source 30 is, for example, a light emitting diode (LED) light source. The light source 30 may be a laser light source or a semiconductor laser light source. Illumination light emitted from the light source 30 is, for example, visible rays of 450 nm.

The collimator 31 converts the illumination light emitted from the light source 30 to parallel light. The illumination light converted to parallel light is incident on the slit 32. The slit 32 is, for example, a ring slit in which an aperture has a ring shape. Illumination light passing through the ring-shaped aperture of the slit 32 passes through the condenser lens 33 and is irradiated to an observation object (not illustrated) placed on the stage 34. The observation object is, for example, cells.

The microscope 3 includes the objective lens unit 35, the objective lens 36, the light blocking plate 37, and the camera 4 serving as a detector. Light emitted from an observation object is incident on the light blocking plate 37 via the objective lens 36. The light blocking plate 37 is disposed at a position which is conjugate with the slit 32. The objective lens 36 and the light blocking plate 37 are included in the objective lens unit 35.

In FIG. 1, a configuration in which the light blocking plate 37 is included in the microscope 3 is illustrated, but the light blocking plate 37 may be disposed outside of the microscope 3 as long as it is disposed at a position which is conjugate with the slit 32. In this case, the light blocking plate 37 constitutes a dark-field transmitted image detection optical system along with a camera or a lens that detects light.

Figure 2:
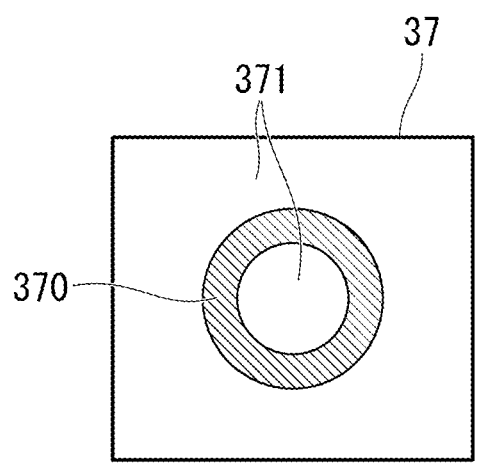
FIG. 2 is a diagram illustrating an example of a configuration of a light blocking plate according to the first embodiment of the present invention.

Now, the configuration of the light blocking plate 37 will be described with reference to FIG. 2. FIG. 2 is a diagram illustrating an example of the configuration of the light blocking plate 37 according to this embodiment. The light blocking plate 37 includes a light blocking portion 370 and a transmitting portion 371. The shape of the light blocking portion 370 is ring-shaped. The shape of the light blocking portion 370 is substantially identical to or includes a shape of an image of a ring-shaped aperture of the slit 32 formed on the light blocking portion 370. The light blocking portion 370 blocks direct light from the light source passing through the observation object. On the other hand, the transmitting portion 371 transmits diffracted light and scattered light emitted from the observation object.

The description of the observation device D1 will be continued with reference back to FIG. 1.

Light transmitted by the light blocking plate 37 is concentrated by the imaging lens 38 and is reflected by the mirror 39 to form an image of the observation object on an imaging plane 310. The camera 4 detects light which is transmitted by the light blocking plate 37 and is focused to form an image by the imaging lens 38. Accordingly, the camera 4 detects a dark-field image in which an image of the observation object is captured through the dark-field observation.

In this way, the camera 4 detects light transmitted by an optical structure. The camera 4 is an example of a detector that detects light passing through the optical structure. The light blocking plate 37 is an example of the optical structure.

In this embodiment, the light source 30, the collimator 31, the slit 32, and the condenser lens 33 are included in an illumination optical system. The objective lens unit 35, the objective lens 36, the light blocking plate 37, the imaging lens 38, and the camera 4 are included in an observation optical system. Accordingly, the observation device D1 includes the illumination optical system including the light source 30 and the slit 32 and the observation optical system including the objective lens unit 35, the objective lens 36, the light blocking plate 37, the imaging lens 38, and the camera 4.

Here, the illumination optical system is a group of optical instruments or devices which are provided to irradiate an observation object with light required for observation from a light source using characteristics such as reflection, transmission, blocking, and refraction of light and is constituted as a combination of a light source, a lens, a mirror, a prism, and the like. The observation optical system is a group of optical instruments or devices which are provided to detect light emitted from an observation object using characteristics such as reflection, transmission, blocking, and refraction of light and is constituted as a combination of a mirror, a lens, a spatial filter, a light blocking plate, a phase plate, a camera, a detection element, and the like.

In dark-field observation according to the related art, only an objective lens with a small numerical aperture (NA) can be used to prevent non-scattered light, that is, direct light, from being incident on the objective lens. On the other hand, in the observation device D1, since the light blocking plate 37 blocks direct light, the numerical aperture of the objective lens 36 can be set to be larger than the numerical aperture of the objective lens used in dark-field observation according to the related art. In the observation device D1 according to this embodiment, it is possible to measure scattered light with a large scattering angle and to enhance a spatial resolution in comparison with dark-field observation according to the related art. Here, scattered light with a large scattering angle includes information of components with high spatial frequencies.

In the observation device D1, since the numerical aperture of the objective lens 36 can be set to be larger than the numerical aperture of the objective lens used in dark-field observation according to the related art, it is not necessary to increase the numerical aperture of a lens included in the illumination optical system and it is possible to enhance the degree of freedom in optical design.

Second Embodiment

A second embodiment will be described below.

In the first embodiment, an example in which a light blocking plate is disposed as an optical structure at the first position has been described. In this embodiment, an example of an observation device in which a phase plate is disposed as a second optical structure at a second position which is a position conjugate with a position at which an aperture member is disposed and which does not correspond to the first position and a phase difference detector that detects a phase difference between direct light emitted from an observation object and passing through the phase plate and diffracted light and/or scattered light at a position closer to an objective lens than to the optical structure in an optical path between the objective lens and the detector is additionally provided will be described. The observation device according to this embodiment is referred to as an observation device D2.

The same elements and operations as in the first embodiment will be referred to by the same reference signs and a description thereof will be omitted.

Figure 3:
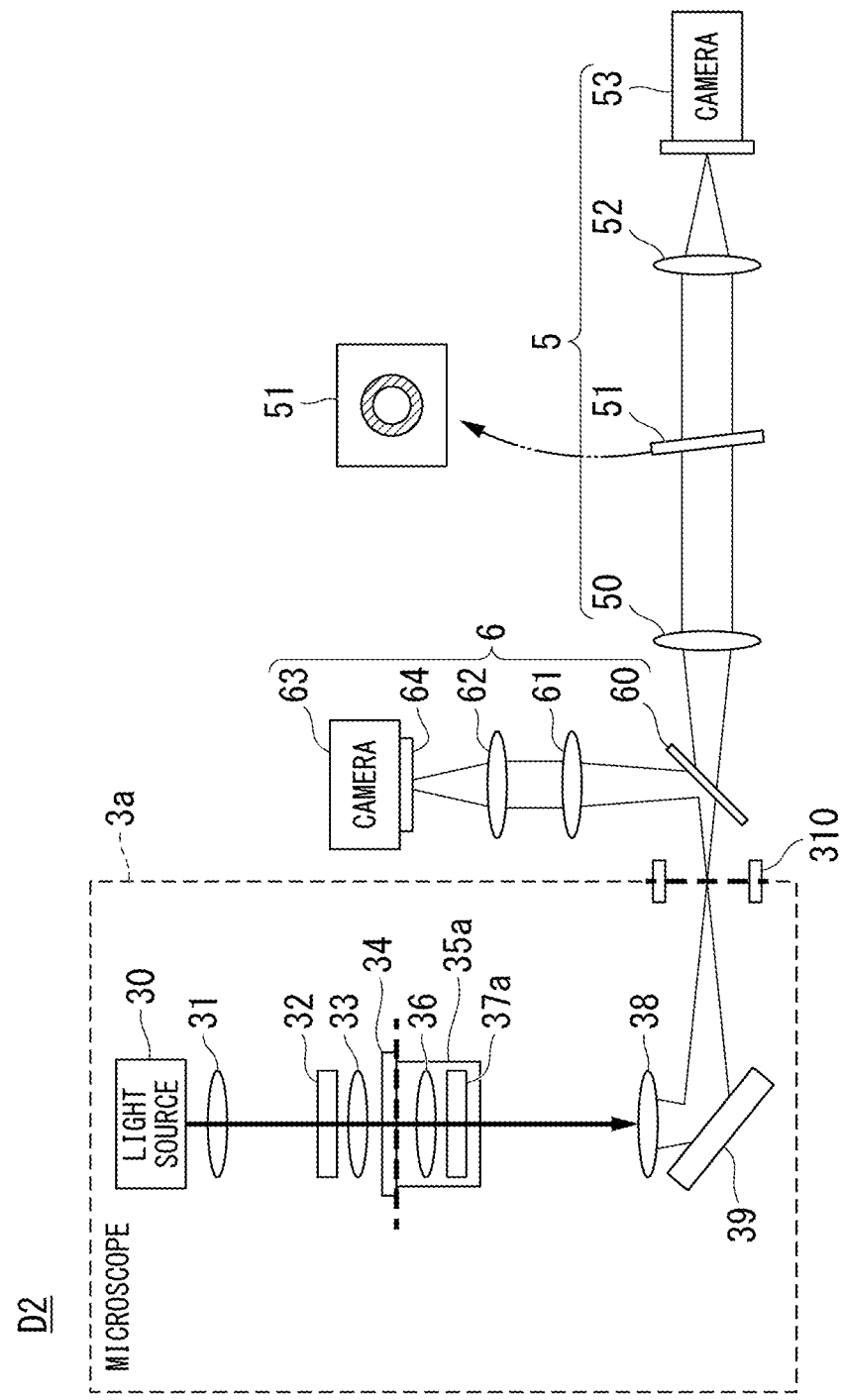
FIG. 3 is a diagram illustrating an example of a configuration of an observation device according to a second embodiment of the present invention.

FIG. 3 is a diagram illustrating an example of the configuration of the observation device D2 according to this embodiment. The observation device D2 includes a microscope 3a, a dark-field transmitted image detection optical system 5, and a phase-difference transmitted image detection optical system 6. The observation device D2 is an observation device that simultaneously performs dark-field image observation and phase-difference image observation. The dark-field transmitted image detection optical system 5 and the phase-difference transmitted image detection optical system 6 are included in the observation optical system.

The microscope 3a is different from the microscope 3 illustrated in FIG. 1 in that the phase plate 37a is provided instead of the light blocking plate 37. The phase plate 37a is disposed at a position which is conjugate with the position at which the slit 32 is disposed. Some light emitted from an observation object is incident on the phase plate 37a via the objective lens 36. A mirror 60 reflects some light emitted from the microscope 3b to guide the light to the phase-difference transmitted image detection optical system 6 and transmits the other light to guide the light to the dark-field transmitted image detection optical system 5. The objective lens 36 and the phase plate 37a are included in the objective lens unit 35a.

The phase plate 37a includes a phase changing portion which is a phase film and a transmitting portion. The shape of the phase changing portion is ring-shaped and substantially identical to the shape of an image of a ring-shaped aperture of the slit 32. The phase changing portion changes the phase of direct light (0-order diffracted light) of light emitted from an observation object. The transmitting portion transmits diffracted light (first-order or higher diffracted light) and scattered light of the light emitted from the observation object. The phase plate 37a is an example of the second optical structure.

The dark-field transmitted image detection optical system 5 includes a lens 50, a light blocking plate 51, a lens 52, and a camera 53. Light forming an image on an imaging plane 310 of the microscope 3a is incident on the lens 50 from the microscope 3a and exits as parallel light. Parallel light exiting the lens 50 is incident on the light blocking plate 51.

Figure 4:
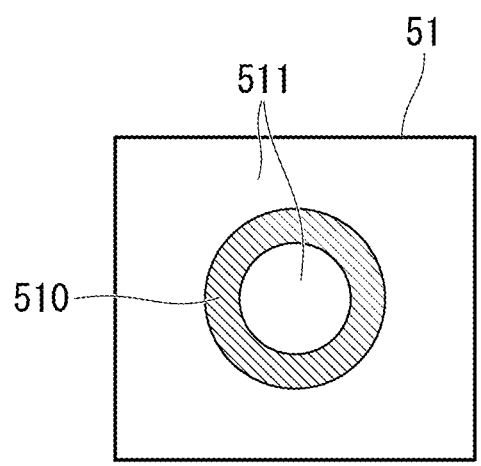
FIG. 4 is a diagram illustrating an example of a configuration of a light blocking plate according to the second embodiment of the present invention.

The light blocking plate 51 is disposed at a position which is conjugate with the position at which the slit 32 is disposed and which is different from the position at which the phase plate 37a is disposed. In this way, in this embodiment, the first position at which the light blocking plate 51 is disposed does not coincide with the second position at which the phase plate 37a is disposed. The configuration of the light blocking plate 51 is the same as the configuration of the light blocking plate 37 illustrated in FIG. 1 and is different therefrom in the position at which it is disposed. FIG. 4 is a diagram illustrating an example of the configuration of the light blocking plate 51 according to this embodiment. The light blocking plate 51 includes a light blocking portion 510 and a transmitting portion 511. The shape of the light blocking portion 510 is ring-shaped. The shape of the light blocking portion 510 is substantially identical to or includes a shape of an image of the ring-shaped phase changing portion of the phase plate 37a formed on the light blocking plate 51 or a shape including the shape. On the other hand, the transmitting portion 511 transmits diffracted light and scattered light emitted from the observation object. The light blocking plate 51 is an example of the optical structure.

Light transmitted by the light blocking plate 51 is focused by the lens 52 and forms an image on an imaging plane of the camera 53. The camera 53 detects dark-field light passing through the light blocking plate 51 which is an optical structure. The dark-field light is diffracted light and scattered light emitted from the observation object.

[Phase Difference Observation]

The phase-difference transmitted image detection optical system 6 is an optical system that is used to perform phase-difference image observation. The phase-difference transmitted image detection optical system 6 includes a mirror 60, a lens 61, a lens 62, a camera 63, and a wavelength filter 64.

The mirror 60 reflects some light emitted from the microscope 3b to guide the light to the camera 63 and transmits the other light to guide the light to the dark-field transmitted image detection optical system 5. The lens 61 converts light reflected by the mirror 60 to parallel light. The lens 62 causes light converted to parallel light by the lens 61 to form an image on an imaging plane of the camera 63.

The camera 63 is disposed at a position closer to the objective lens 36 than the light blocking plate 51 in an optical path between the objective lens 36 and the camera 53. The camera 63 detects light imaged by the lens 62. Here, the wavelength filter 64 is provided on the lens 62 side of the imaging plane of the camera 63. The wavelength filter 64 transmits light of a wavelength included in a predetermined wavelength range in which the phase difference observation is performed and does not transmit light of a wavelength not included in the wavelength range. Accordingly, the camera 63 detects light passing through the wavelength filter 64 out of the light imaged by the lens 62.

Here, the light imaged by the lens 62 is direct light and diffracted light and scattered light which have been emitted from an observation object and which have passed through the phase plate 37a. Diffracted light generated when light has passed through an object causing diffraction (a phase object) in an observation object has a phase difference from direct light. When direct light of which the phase has been modulated by the phase plate 37a is formed an image together with the diffracted light and the scattered light, an image of the phase object has contrast with respect to the surroundings by interfering the direct light with the diffracted light and the scattered light. The camera 63 detects a phase difference between the direct light and the diffracted light and the scattered light. The camera 63 detects a phase-difference image in which an image of the observation object with contrast is captured on the basis of the detected phase difference. In this phase difference observation, the phase difference between the direct light and the diffracted light and the scattered light due to differences in refractive index among the parts of the observation object is detected with contrast. The camera 63 is an example of the phase difference detector.

Third Embodiment

A third embodiment of the present invention will be described below with reference to the accompanying drawing.

In the first embodiment, an example in which dark-field image observation is performed using an observation device has been described. In the second embodiment, an example in which dark-field image observation and phase-difference image observation are simultaneously performed has been described. In this embodiment, an example in which bright-field image observation and epi-fluorescence image observation along with dark-field image observation and phase-difference image observation are simultaneously performed using an observation device will be described. The observation device according to this embodiment is referred to as an observation device D3.

The same elements and operations as in the first embodiment will be referred to by the same reference signs and a description thereof will be omitted.

Figure 5:
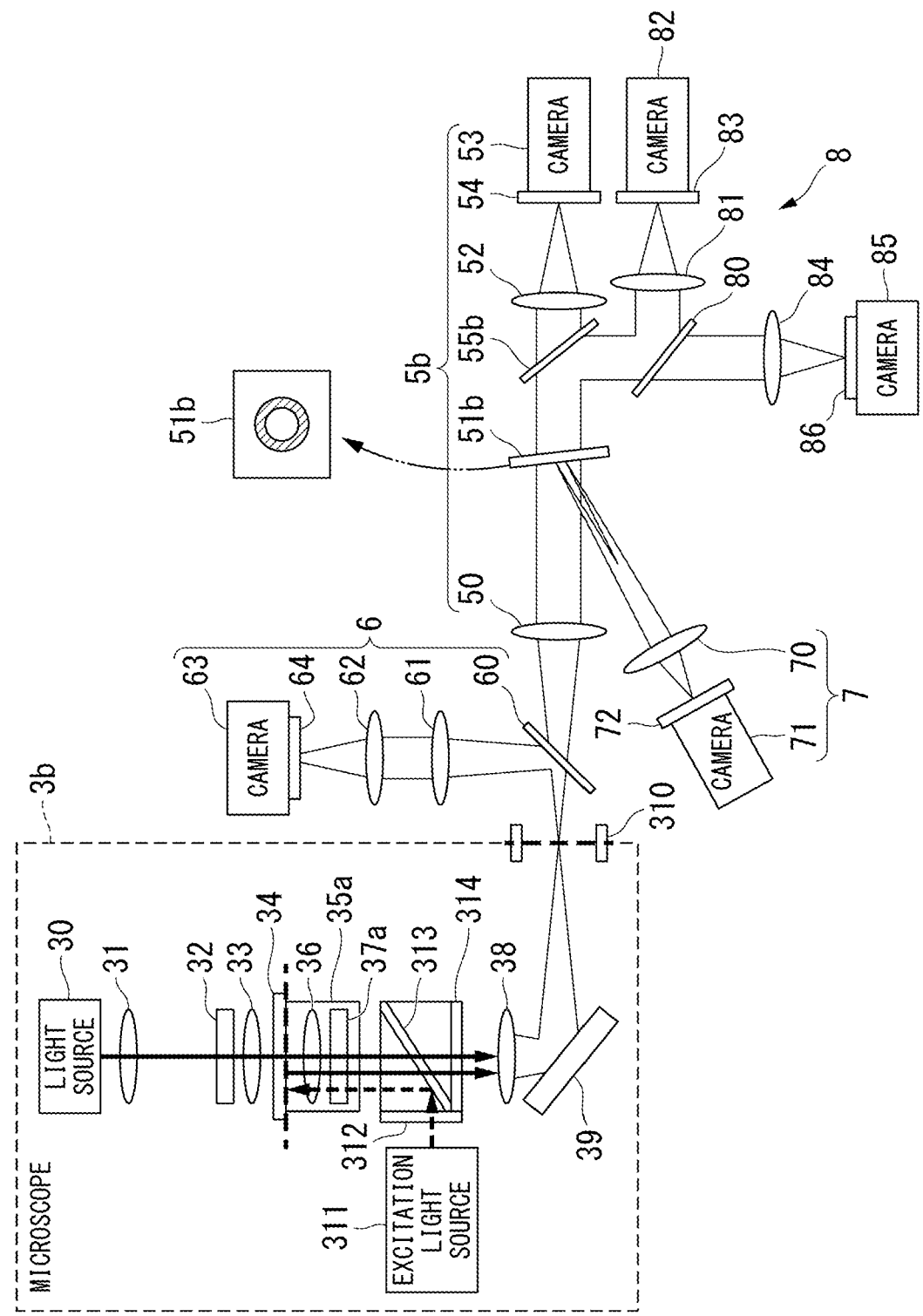
FIG. 5 is a diagram illustrating an example of a configuration of an observation device according to a third embodiment of the present invention.

FIG. 5 is a diagram illustrating an example of the configuration of the observation device D3 according to this embodiment. The observation device D3 includes a microscope 3b, a dark-field transmitted image detection optical system 5b, a phase-difference transmitted image detection optical system 6, a bright-field transmitted image detection optical system 7, and an epi-fluorescence image detection optical system 8. The dark-field transmitted image detection optical system 5b, the phase-difference transmitted image detection optical system 6, the bright-field transmitted image detection optical system 7, and the epi-fluorescence image detection optical system 8 are included in the observation optical system.

The microscope 3b is different from the microscope 3a according to the second embodiment illustrated in FIG. 3 in that a configuration for performing epi-fluorescence observation is provided. The configuration for performing epi-fluorescence observation includes an excitation light source 311, an excitation filter 312, a dichroic mirror 313, and an absorption filter 314.

The excitation light source 311 is a light source that irradiates an observation object with excitation light. The excitation light source 311 is, for example, a mercury lamp. The excitation light source 311 may be a laser light source or an LED light source. The excitation filter 312 is, for example, a band-pass filter and transmits light of a specific wavelength of light emitted from the excitation light source 311 but does not transmit light of a wavelength other than the specific wavelength. The dichroic mirror 313 reflects excitation light emitted from the excitation light source 311 and passing through the excitation filter 312 and irradiates it to an observation object placed on a stage 34. On the other hand, the dichroic mirror 313 transmits fluorescence emitted from the observation object to guide the fluorescence to an imaging lens 38. The absorption filter 314 transmits fluorescence emitted from the observation object and absorbs superfluous light that interfere with fluorescence image observation.

Fluorescence passing through the absorption filter 314 is reflected by the mirror 39 via the imaging lens 38 and is emitted from the microscope 3b.

The excitation light source 311, the excitation filter 312, and the dichroic mirror 313 constitute an epi-fluorescence illumination optical system that irradiates an observation object with illumination light from below. Accordingly, an illumination optical system provided in the observation device D3 includes the epi-fluorescence illumination optical system.

Two types of light are emitted from the microscope 3b. A first type of light is light which is generated by irradiating an observation object with light emitted from the light source 30 such as direct light, diffracted light, and scattered light. A second type of light is fluorescence which is generated by irradiating an observation object with excitation light emitted from the excitation light source 311.

Observation using the observation device D3 will be described below in the order of phase difference observation, dark field observation, bright field observation, and epi-fluorescence observation.

[Phase Difference Observation]

The phase-difference transmitted image detection optical system 6 is an optical system that is used to perform phase-difference image observation. The configuration of the phase-difference transmitted image detection optical system 6 is the same as the configuration of the phase-difference transmitted image detection optical system 6 illustrated in FIG. 3 and thus a detailed description thereof will be omitted. A mirror 60 reflects some light emitted from the microscope 3b to guide the light to the phase-difference transmitted image detection optical system 6 and transmits the other light to guide the light to the dark-field transmitted image detection optical system 5b.

[Dark Field Observation]

The dark-field transmitted image detection optical system 5b includes a lens 50, a reflecting member 51b, a lens 52, a camera 53, a wavelength filter 54, and a dichroic mirror 55b. The dark-field transmitted image detection optical system 5b is different from the dark-field transmitted image detection optical system 5 illustrated in FIG. 3 in that the reflecting member 51b is provided instead of the light blocking plate 51 and the wavelength filter 54 and the dichroic mirror 55b are provided.

The reflecting member 51b is disposed at a position which is conjugate with the position at which the slit 32 is disposed and which is different from the position of the phase plate 37a. Light transmitted by the mirror 60 is converted to parallel light by the lens 50 and is incident on the reflecting member 51b. The reflecting member 51b is an example of an optical structure.

Figure 6:
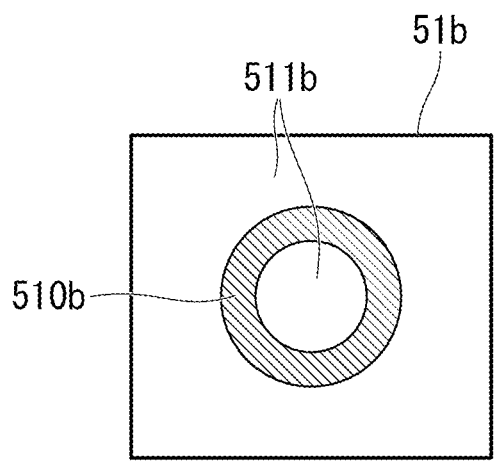
FIG. 6 is a diagram illustrating an example of a configuration of a reflecting member according to the third embodiment of the present invention.

The configuration of the reflecting member 51b will be described below with reference to FIG. 6. FIG. 6 is a diagram illustrating an example of the configuration of the reflecting member 51b according to this embodiment. The reflecting member 51b includes a reflecting portion 510b and a transmitting portion 511b. A shape obtained by projecting the reflecting portion 510b to a plane perpendicular to an optical axis is a ring-shaped and substantially identical to or includes the shape of an image of the phase changing portion of the phase plate 37a formed on the reflecting member 51b. The reflecting portion 510b reflects direct light (zeroth-order diffracted light) of light emitted from an observation object to guide the light to the bright-field transmitted image detection optical system 7. Here, the normal line of the reflecting member 51b is inclined with respect to the optical axis. Accordingly, the reflecting member 51b reflects direct light in a direction not parallel to the optical axis. The transmitting portion 511b transmits diffracted light, scattered light, and fluorescence out of the light emitted from the observation object.

The reflecting portion 510b is, for example, a ring-shaped mirror.

The observation device D3 will be continued with reference back to FIG. 5.

The wavelength filter 54 is provided on the lens 52 side of the imaging plane of the camera 53. The wavelength filter 54 transmits light of a wavelength included in a predetermined wavelength range in which the dark field observation is performed and does not transmit light of a wavelength not included in the wavelength range. Accordingly, the camera 53 detects light passing through the wavelength filter 54 out of the light imaged by the lens 52.

The dichroic mirror 55b reflects light of a predetermined wavelength or greater out of light transmitted by the reflecting member 51b and transmits light of less than the predetermined wavelength. The predetermined wavelength is, for example, 500 nm. The dichroic mirror 55b transmits light (diffracted light and scattered light) which is generated by irradiating an observation object with light emitted from the light source 30 to guide the light to the camera 53. On the other hand, the dichroic mirror 55b reflects fluorescence which is generated by irradiating the observation object with excitation light emitted from the excitation light source 311 to guide the light to the epi-fluorescence image detection optical system 8.

The light transmitted by the dichroic mirror 55b is caused to form an image on the imaging plane of the camera 53 by the lens 52.

[Bright Field Observation]

The bright-field transmitted image detection optical system 7 is an optical system that is used to perform bright field observation. The bright-field transmitted image detection optical system 7 includes a lens 70, a camera 71, and a wavelength filter 72.

The lens 70 causes direct light reflected by the reflecting member 51b to form an image on an imaging plane of the camera 71. Accordingly, the camera 71 detects a bright-field transmitted image in which an image of an observation object appears through bright field observation. Here, the wavelength filter 72 is provided on the lens 70 side of the imaging plane of the camera 71. The wavelength filter 72 transmits light of a wavelength included in a predetermined wavelength range in which the phase bright field observation is performed and does not transmit light of a wavelength not included in the wavelength range. Accordingly, the camera 71 detects light passing through the wavelength filter 72 out of the light imaged by the lens 70. In this bright field observation, an intensity change of light absorbed by each part of the observation object is detected as contrast of an image.

[Epi-Fluorescence Observation]

The epi-fluorescence image detection optical system 8 is an optical system that is used to perform epi-fluorescence observation. The epi-fluorescence image detection optical system 8 includes a dichroic mirror 80, a lens 81, a camera 82, a wavelength filter 83, a lens 84, a camera 85, and a wavelength filter 86.

The dichroic mirror 80 transmits light of a wavelength in a predetermined range out of light reflected by the dichroic mirror 55b and reflects light of a wavelength outside of the predetermined range. Here, the predetermined wavelength range ranges, for example, from 550 nm to 650 nm. In this case, the dichroic mirror 80 reflects fluorescence based on dyeing of fluorescein isothiocyanate (FITC) out of fluorescence emitted from the observation object to guide the fluorescence to the camera 82. On the other hand, the dichroic mirror 80 transmits fluorescence based on dyeing of propidium iodide (PI) out of fluorescence emitted from the observation object to guide the fluorescence to the camera 85.

The lens 81 causes fluorescence reflected by the dichroic mirror 80 (fluorescence based on dyeing of FITC) to form an image on an imaging plane of the camera 82. Accordingly, the camera 82 detects an epi-fluorescence image in which an image of the observation object is captured through epi-fluorescence observation. Here, the wavelength filter 83 is provided on the lens 81 side of the imaging plane of the camera 82. The wavelength filter 83 transmits light of a wavelength included in a predetermined wavelength range in which the epi-fluorescence observation is performed and does not transmit light of a wavelength not included in the wavelength range. Accordingly, the camera 82 detects light passing through the wavelength filter 83 out of the light imaged by the lens 81. In this epi-fluorescence image, an image is detected on the basis of an intensity of fluorescence emitted from the observation object dyed with FITC.

The lens 84 causes fluorescence transmitted by the dichroic mirror 80 (fluorescence based on dyeing of PI) to form an image on an imaging plane of the camera 85. Accordingly, the camera 82 detects an epi-fluorescence image in which an image of the observation object is captured through epi-fluorescence observation. Here, the wavelength filter 86 is provided on the lens 84 side of the imaging plane of the camera 85. The wavelength filter 86 transmits light of a wavelength included in a predetermined wavelength range in which the epi-fluorescence observation is performed and does not transmit light of a wavelength not included in the wavelength range. Accordingly, the camera 85 detects light passing through the wavelength filter 86 out of the light imaged by the lens 84. In this epi-fluorescence image, an image is detected on the basis of the intensity of fluorescence emitted from the observation object dyed with PI.

The camera 82, the camera 85, the lens 81, and the lens 84 detect fluorescence obtained by causing fluorescence which is generated by irradiation of an observation object with illumination light by the epi-fluorescence illumination optical system to pass through the reflecting member 51b which is an example of the optical structure. The camera 82 and the camera 85 are examples of an epi-fluorescence detector. The observation optical system includes an epi-fluorescence detector. In FIG. 5, an example in which two fluorescence detectors are provided is illustrated, but the present invention is not limited thereto. The number of epi-fluorescence detectors included in the epi-fluorescence illumination optical system may be one or three or more.

As described above, in the observation device D3, a dark-field image is detected by the dark-field transmitted image detection optical system 5b, a phase-difference image is detected by the phase-difference transmitted image detection optical system 6, a bright-field transmitted image is detected by the bright-field transmitted image detection optical system 7, and two types of epi-fluorescence images are detected by the epi-fluorescence image detection optical system 8. With the observation device D3, since the plurality of types of images can be acquired concurrently, it is possible to suppress variability in measurement due to state changes of an observation object in comparison with a case in which a plurality of types of images are acquired through a plurality of times of measurement. With the observation device D3, since measurement images of an observation object can be simultaneously acquired, it is not necessary to perform measurement a plurality of times to acquire a plurality of types of images and it is possible to shorten the time required for measuring the images.

In the observation device D3, a plurality of detectors (the camera 53, the camera 63, the camera 71, the camera 82, and the camera 85) are used to acquire the plurality of types of images but no detector is shared. When a detector is shared to detect the plurality of types of images, sensors of the detector need to be assigned to each of the plurality of types of images, and thus the sizes of the sensors which can be used for each of the plurality of types of images becomes smaller than the sizes of the sensors originally provided in the detector. On the other hand, in the observation device D3, since a detector is not shared to detect the plurality of types of images, it is possible to perform detection in sizes of the sensors originally provided in the detectors. Accordingly, with the observation device D3, it is possible to detect a plurality of types of images with a high spatial resolution without scarifying the spatial resolutions of the detectors.

In the first embodiment, the second embodiment, and the third embodiment, an example in which an image of an observation object placed on a stage of a microscope is observed using an observation device has been described, but the present invention is not limited thereto. The observation device may include a micro-fluid device including a flow channel in which an observation object is able to flow along with a fluid and may observe the observation object flowing in the flow channel. That is, the observation device may be used for flow cytometry. In a fourth embodiment, a fifth embodiment, and a sixth embodiment which will be described below, an example in which an observation device is used for flow cytometry will be described respectively.

Fourth Embodiment

A fourth embodiment of the present invention will be described below in detail with reference to the accompanying drawing.

In the second embodiment and the third embodiment, an example in which a plurality of types of observation are simultaneously performed and an image is detected in each type of observation has been described. In this embodiment, a detection optical system using ghost cytometry that can directly and rapidly acquire morphological information of an observation object, without reconfiguring an image, from time-series waveforms indicating a time-series change in intensity of an optical signal acquired through observation is included as a part of a detection system which is provided in an observation device. The observation device according to this embodiment is referred to as an observation device D4. In the observation device D4, for example, a part of phase difference detection and dark field detection is performed using a detection method capable of directly acquiring morphological information of an observation object from time-series waveform information, which is information indicating time-series waveforms of an optical signal, without reconfiguring an image. In the following description, the detection optical system that acquires time-series waveforms from which morphological information of an observation object can be directly acquired is referred to as a waveform detection optical system.

In this embodiment, the waveform detection optical system using ghost cytometry detects light emitted from an observation object through structural detection in which a spatial modulator such as a structural mask pattern is provided in an optical path between an objective lens and a detector. The detector receives the light to which light emitted from the observation object is structured by the spatial modulator to have a plurality of regions with different optical characteristics. A plane of the spatial modulator on which light is incident has a structure in which a plurality of regions are irregularly distributed in a certain area, and light passing through the spatial modulator is converted into structured light through modulation differing depending on the regions. In this specification, modulating light using a plurality of regions of the spatial modulator which are irregularly distributed in this way is also referred to as randomly modulating incident light by regions. An optical structure of light modulated by the spatial modulator is, for example, a structure in which light and dark binary values are randomly distributed. The optical structure has a fixed and specific structure, but spatial information of the observation object is compressively included in a temporal waveform signal of an optical signal to be detected by performing measurement while relatively moving the optical structure and the observation object. A flow cytometer using ghost cytometry that directly analyzes time-series waveforms of an optical signal emitted from an observation object using machine learning, without reconfiguring the optical signal as an image, has already been reported, and it is possible to rapidly and accurately perform analysis and classification by optimizing a classifier for classifying an observation object by machine learning.

The same elements and operations as in the third embodiment will be referred to by the same reference signs and a description thereof will be omitted.

Figure 7:
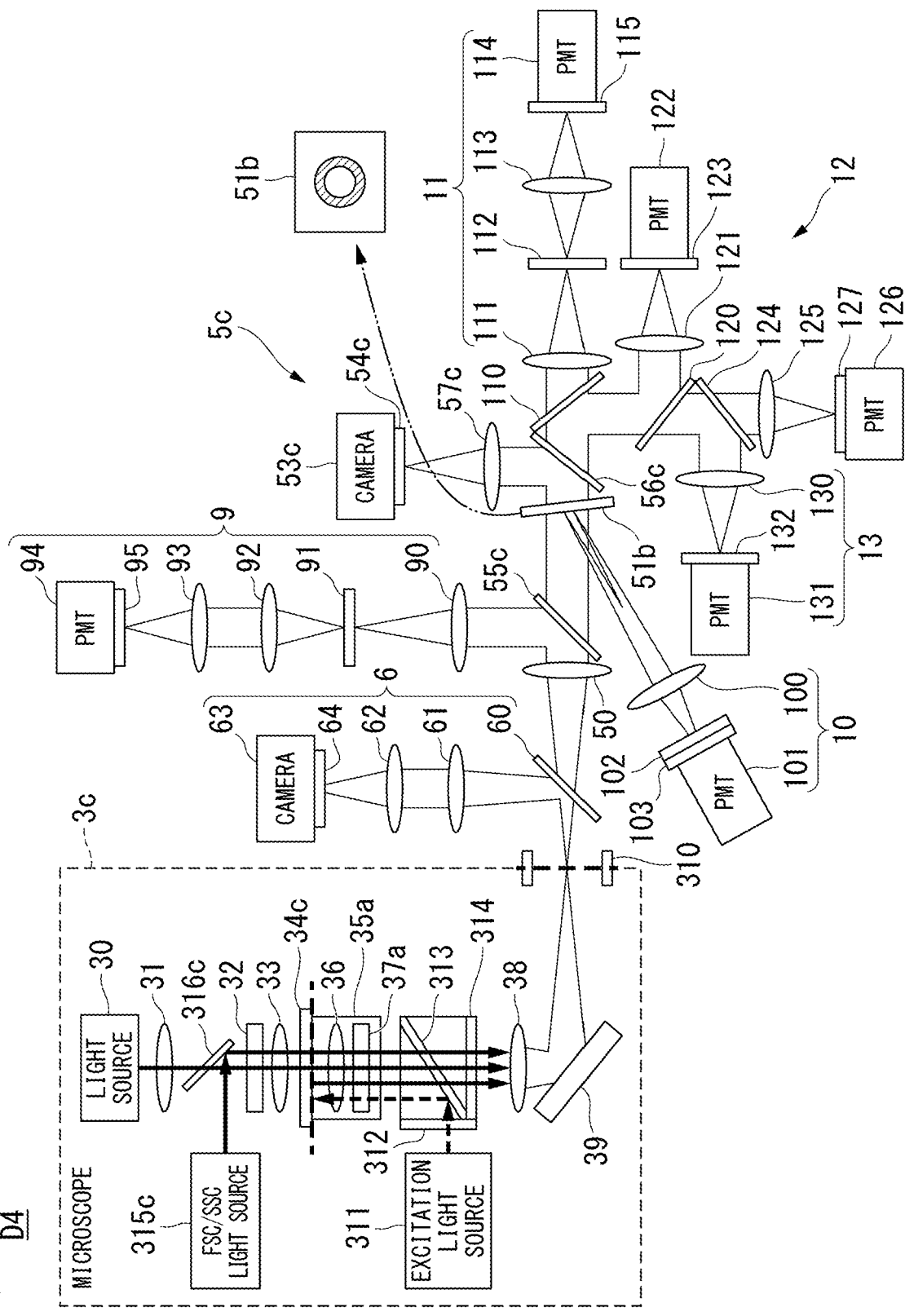
FIG. 7 is a diagram illustrating an example of a configuration of an observation device according to a fourth embodiment of the present invention.

FIG. 7 is a diagram illustrating an example of the configuration of the observation device D4 according to this embodiment. The observation device D4 includes a micro-fluid device (not illustrated) in addition to an illumination optical system and an observation optical system. The micro-fluid device includes a flow channel in which an observation object is able to flow along with a fluid.

The observation device D4 includes a microscope 3c, a dark-field transmitted image detection optical system 5c, a phase-difference transmitted image detection optical system 6, a phase-difference waveform detection optical system 9, a forward scattered light (FSC) detection optical system 10, a dark-field waveform detection optical system 11, a fluorescence detection optical system 12, and a side scattered light (SSC) detection optical system 13. The micro-fluid device is provided in the microscope 3c. The observation device D4 is an observation device that is provided in a flow cytometer.

As will be described below, photomultiplier tubes (PMTs) are provided as constituents in the detection optical system of the observation device D4. Such PMTs (a PMT 94, a PMT 101, a PMT 114, a PMT 122, a PMT 131, and a PMT 126) are single-channel photodetectors (single PMTs).

A structural pattern mask is provided as a constituent in a part of the detection optical system of the observation device D4. The structural pattern mask modulates light emitted from the microscope 3c. Light modulated by the structural pattern mask includes light passing through a reflecting member 51b which is an optical structure. Modulating light means, for example, structuring light by changing optical characteristics such as an intensity of light for each region of a space. The structural pattern mask is an example of a spatial modulation unit that modulates light passing through an optical structure.

In the example illustrated in FIG. 7, the structural pattern mask (a structural pattern mask 91 and a structural pattern mask 112) is a spatial filter including a region transmitting light and a region not transmitting light. An example of such structural pattern masks is a film in which a plurality of regions with different optical characteristics are printed on a surface thereof.

Optical instruments included in the microscope 3c which are provided in an optical path from a light source to an observation object are included in the illumination optical system. The optical instruments of the microscope 3c provided in an optical path from an observation object to an imaging plane 310, the dark-field transmitted image detection optical system 5c, the phase-difference transmitted image detection optical system 6, the phase-difference waveform detection optical system 9, the FSC detection optical system 10, the dark-field waveform detection optical system 11, the fluorescence detection optical system 12, and the SSC detection optical system 13 are included in the observation optical system. Some optical instruments of the microscope 3c are included in both the illumination optical system and the observation optical system.

The microscope 3c is different from the microscope 3b according to the third embodiment illustrated in FIG. 5 in that constituents for detecting FSC and SSC are provided and a flow cell 34c is provided instead of the stage 34. The constituents for detecting FSC and SSC include an FSC/SSC light source 315c and a dichroic mirror 316c.

FSC and SSC are used to detect morphological information of an observation object such as cells without performing labeling (label-free).

The flow cell 34c is a flow channel in which an observation object such as cells flows along with a fluid.

The FSC/SSC light source 315c is a light source of light with which an observation object is irradiated to acquire FSC and SSC, and an example of light for acquiring FSC/SSC is laser light. The dichroic mirror 316c reflects light of a predetermined wavelength or greater and transmits light of less than the predetermined wavelength. The predetermined wavelength is, for example, 500 nm. For example, when light emitted from the light source 30 is light of a wavelength of 450 nm and laser light emitted from the FSC/SSC light source 315c is light of a wavelength of 637 nm, the dichroic mirror 316c transmits light emitted from the light source 30 and reflects the laser light emitted from the FSC/SSC light source 315c to guide the light and the laser light to an observation object.

The light emitted from the FSC/SSC light source 315c to the observation object is scattered by the observation object. Scattered light generated through scattering in the observation object is transmitted by the dichroic mirror 313, passes through the imaging lens 38 and the mirror 39, and is emitted from the microscope 3c.

Three types of light are emitted from the microscope 3c. Two of the three types of light are the same as the two types of light emitted from the microscope 3b illustrated in FIG. 5. The third light is FSC and SSC which are generated by allowing the observation object to scatter the laser light.

The optical systems that detect various types of light in the observation device D4 will be sequentially described below. The phase-difference transmitted image detection optical system 6 is the same as that in the observation device D3 illustrated in FIG. 5 and thus a description thereof will be omitted.

[Dark Field Observation]

The dark-field transmitted image detection optical system 5c includes a lens 50, a mirror 55c, a reflecting member 51b, a mirror 56c, a lens 57c, a camera 53c, and a wavelength filter 54c. The dark-field transmitted image detection optical system 5c is different from the dark-field transmitted image detection optical system 5b illustrated in FIG. 5 in that the mirror 55c, the mirror 56c, the lens 57c, the camera 53c, and the wavelength filter 54c are provided.

The mirror 55c reflects some parallel light emitted from the lens 50 to guide the parallel light to the phase-difference waveform detection optical system 9 and transmits the other parallel light to guide the parallel light to the mirror 56c.

The reflecting member 51b reflects FSC out of diffracted light and scattered light emitted from an observation object using a reflecting portion 510b to guide the FSC to the FSC detection optical system 10.

The mirror 56c reflects some light transmitted by the transmitting portion 511b of the reflecting member 51b to the camera 53c and transmits the other light to guide the light to the dark-field waveform detection optical system 11.

The lens 57c, the camera 53c, and the wavelength filter 54c have the same functions as the lens 52, the camera 53, and the wavelength filter 54 illustrated in FIG. 5, respectively. As the configuration is similar to each other except that their positions and directions are different from those disposed in the observation device D3, a description thereof will be omitted.

[Phase-Difference Waveform Detection]

The phase-difference waveform detection optical system 9 is an optical system that is used to detect temporal waveforms based on observation of a phase difference between direct light and diffracted light and scattered light which are emitted from an observation object. The phase-difference waveform detection optical system 9 includes a lens 90, a structural pattern mask 91, a lens 92, a lens 93, a PMT 94, and a wavelength filter 95.

The lens 90 causes parallel light reflected by the mirror 55c to form an image at the position of the structural pattern mask 91. The lens 92 converts light structured by the structural pattern mask 91 to parallel light and causes the parallel light to be incident on the lens 93. The lens 93 concentrates structured light converted to parallel light by the lens 92 to the PMT 94. The PMT 94 detects, by detecting a phase difference between structured light of direct light emitted from the observation object and structured light of diffracted light and scattered light in a time series, a temporal waveform based on light phase difference observation of those lights. Here, the wavelength filter 95 is provided on the lens 93 side of the detection plane of the PMT 94. The wavelength filter 95 transmits light of a wavelength included in a predetermined wavelength range in which detection of a temporal waveform based on a phase-difference image is performed and does not transmit light of a wavelength not included in the wavelength range. Accordingly, the PMT 94 detects light passing through the wavelength filter 95 out of the light imaged by the lens 93.

[Fsc Detection]

The FSC detection optical system 10 is an optical system that is used to detect FSC (intensity of forward scattered light) emitted from an observation object through irradiation with light from an FSC/SSC light source. The FSC detection optical system 10 includes a lens 100, a PMT 101, a wavelength filter 102, and a spatial filter 103.

The lens 100 concentrates FSC reflected by the reflecting member 51b on the PMT 101. The PMT 101 detects FSC out of the light emitted from the observation object. Here, the wavelength filter 102 and the spatial filter 103 are provided on the lens 100 side of a detection plane of the PMT 101. The wavelength filter 102 transmits light of a wavelength included in a predetermined wavelength range in which the FSC detection is performed and does not transmit light of a wavelength not included in the wavelength range. On the other hand, the spatial filter 103 blocks direct light out of incident light and transmits FSC propagating forward. Accordingly, the PMT 101 detects FSC of the light transmitted by the wavelength filter 102 and the spatial filter 103 out of light imaged by the lens 100. FSC is used to acquire information of the size of the observation object.

In FIG. 7, an example in which the wavelength filter 102 and the spatial filter 103 are provided in the order of the wavelength filter 102 and the spatial filter 103 from the side of the detection plane of the PMT 101 close to the lens 100 is illustrated, but the wavelength filter 102 and the spatial filter 103 may be provided in the order of the spatial filter 103 and the wavelength filter 102 from the side of the detection plane of the PMT 101 close to the lens 100.

[Dark-Field Waveform Detection]

The dark-field waveform detection optical system 11 is an optical system that is used to detect a waveform of dark-field light emitted from an observation object through dark field observation. The dark-field waveform detection optical system 11 includes a dichroic mirror 110, a lens 111, a structural pattern mask 112, a lens 113, a PMT 114, and a wavelength filter 115.

The configuration of the dichroic mirror 110 is the same as the configuration of the dichroic mirror 55b illustrated in FIG. 5. The dichroic mirror 110 transmits light (diffracted light and scattered light) which is generated by irradiating an observation object with light emitted from the light source 30 to guide the light to the PMT 114. On the other hand, the dichroic mirror 110 reflects fluorescence which is generated by irradiating the observation object with excitation light emitted from the excitation light source 311 and scattered light which is generated by irradiating the observation object with laser light emitted from the FSC/SSC light source 315c to guide the fluorescence and the scattered light to the fluorescence detection optical system 12 and the SSC detection optical system 13.

The lens 111 causes light transmitted by the dichroic mirror 110 to form an image at the position of the structural pattern mask 112. The structural pattern mask 112 causes the imaged light to be incident as structured light on the lens 113. The lens 113 concentrates the structured light structured by the structural pattern mask 112 to the PMT 114. The PMT 114 detects structured light of dark-field light emitted from the observation object in a time series. Here, the wavelength filter 115 is provided on the lens 113 side of the detection plane of the PMT 114. The wavelength filter 115 transmits light of a wavelength included in a predetermined wavelength range in which dark-field waveform detection is performed and does not transmit light of a wavelength not included in the wavelength range. Accordingly, the PMT 114 detects light passing through the wavelength filter 115 out of the light imaged by the lens 113.

[Fluorescence Detection]

The fluorescence detection optical system 12 is an optical system that is used to detect fluorescence emitted from an observation object by irradiation from the excitation light source 311. The fluorescence detection optical system 12 includes a dichroic mirror 120, a lens 121, a PMT 122, a wavelength filter 123, a dichroic mirror 124, a lens 125, a PMT 126, and a wavelength filter 127.

The configuration of the dichroic mirror 120 is the same as the configuration of the dichroic mirror 80 illustrated in FIG. 5. The dichroic mirror 120 reflects fluorescence based on dyeing of FITC out of light reflected by the dichroic mirror 110 to guide the fluorescence to the PMT 122. On the other hand, the dichroic mirror 120 transmits fluorescence based on dyeing of PI out of the light reflected by the dichroic mirror 110 to guide the fluorescence to the PMT 126.

The lens 121 concentrates fluorescence reflected by the dichroic mirror 120 on the PMT 122. The PMT 122 detects an intensity of fluorescence emitted from the observation object dyed with FITC in a time series. Here, the wavelength filter 123 is provided on the lens 121 side of a detection plane of the PMT 122. The wavelength filter 123 transmits light of a wavelength included in a predetermined wavelength range in which the fluorescence detection is performed and does not transmit light of a wavelength not included in the wavelength range. Accordingly, the PMT 122 detects light transmitted by the wavelength filter 123 out of light imaged by the lens 121.

The dichroic mirror 124 reflects light of a wavelength in a predetermined range out of light transmitted by the dichroic mirror 120 and transmits light of a wavelength outside of the predetermined range. The predetermined range includes, for example, a wavelength of 637 nm. The dichroic mirror 124 transmits fluorescence based on dyeing of PI as fluorescence emitted from the observation object out of light transmitted by the dichroic mirror 120 to guide the fluorescence to the PMT 126. On the other hand, the dichroic mirror 124 reflects SSC emitted from the observation object out of light transmitted by the dichroic mirror 120 to guide the SSC to the SSC detection optical system 13.

The lens 125 concentrates fluorescence transmitted by the dichroic mirror 124 on the PMT 126. The PMT 126 detects an intensity of fluorescence emitted from the observation object dyed with PI in a time series. Here, the wavelength filter 127 is provided on the lens 125 side of a detection plane of the PMT 126. The wavelength filter 127 transmits light of a wavelength included in a predetermined wavelength range in which the fluorescence detection is performed and does not transmit light of a wavelength not included in the wavelength range. Accordingly, the PMT 126 detects light transmitted by the wavelength filter 127 out of light imaged by the lens 125.

[SSC Detection]

The SSC detection optical system 13 is an optical system that is used to detect SSC emitted from an observation object by irradiation from the FSC/SSC light source 315c. The SSC detection optical system 13 includes a lens 130, a PMT 131, and a wavelength filter 132.

The lens 130 concentrates SSC reflected by the dichroic mirror 124 on the PMT 131. The PMT 131 detects SSC out of the light emitted from the observation object. Here, the wavelength filter 132 is provided on the lens 130 side of a detection plane of the PMT 131. The wavelength filter 132 transmits light of a wavelength included in a predetermined wavelength range in which the SSC detection is performed and does not transmit light of a wavelength not included in the wavelength range. Accordingly, the PMT 131 detects light transmitted by the wavelength filter 132 out of light imaged by the lens 130. SSC is used to acquire information of the internal structure of the observation object.

In the observation device D4, the lens 92, the lens 93, and the lens 113 are lenses provided between the detector and the spatial modulator and are a so-called relay lens.

In this embodiment, an example in which the dark-field transmitted image detection optical system 5c includes the reflecting member 51b has been described, but the present invention is not limited thereto. The dark-field transmitted image detection optical system 5c may include a wavelength filter, a spatial filter, and a detector that detects FSC instead of the reflecting member 51b and the FSC detection optical system 10.

This wavelength filter has the same function as the wavelength filter 132. The spatial filter blocks direct light and transmits FSC. The size of the region of the spatial filter in which direct light is blocked is equal to or larger than the size of the region which is irradiated with direct light. This detection portion detects FSC transmitted by the wavelength filter and the spatial filter using photodetection elements arranged in a predetermined shape. The region in which the photodetection elements are arranged is broader than the region of the spatial filter in which direct light is blocked.

In this case, instead of detecting FSC reflected by the reflecting member 51b using the FSC detection optical system 10 as in this embodiment, FSC is detected at a position at which the reflecting member 51b is provided in the dark-field transmitted image detection optical system 5c illustrated in FIG. 7.

In this embodiment, an example in which a structural pattern mask (the structural pattern mask 91 and the structural pattern mask 112) which is a spatial filter including a region in which light is transmitted and a region in which light is not transmitted is provided as a spatial modulation unit provided in the phase-difference waveform detection optical system 9 and the dark-field waveform detection optical system 11 has been described, but the present invention is not limited thereto. As the spatial modulation unit, a digital micromirror device (DMD) or a reflective mask including a mirror that reflects light may be provided instead of the structural pattern mask. When the DMD or the reflective mask is provided, the DMD or the reflective mask is disposed such that light to be detected is reflected to the PMT in the phase-difference waveform detection optical system or the dark-field transmitted image detection optical system. For example, when the DMD is provided, the DMD reflects light to be detected in a direction in which the light is received by the PMT, and reflects light not to be detected in a direction other than the PMT. The spatial modulation unit is an optical instrument that controls a spatial distribution of light to modulate the light.

In this embodiment, an example in which the fluorescence detection optical system 12 detects fluorescence without using a structural pattern mask has been described, but the present invention is not limited thereto. The fluorescence detection optical system 12 may include a structural pattern mask.

When fluorescence emitted from an observation object dyed with FITC is detected via a structural pattern mask, the fluorescence detection optical system 12 includes a structural pattern mask and a lens that concentrates light structured by the structural pattern mask on the PMT 122 between the lens 121 and the PMT 122.

When fluorescence emitted from an observation object dyed with PI is detected via a structural pattern mask, the fluorescence detection optical system 12 includes a structural pattern mask and a lens that concentrates light structured by the structural pattern mask on the PMT 126 between the lens 125 and the PMT 126.

As described above, the observation device D4 according to this embodiment includes the phase-difference waveform detection optical system 9, the FSC detection optical system 10, the dark-field waveform detection optical system 11, the fluorescence detection optical system 12, and the SSC detection optical system 13. With this configuration, the observation device D4 can simultaneously detect morphological information of a plurality of types of observation objects from measurement data (time-series changes in intensity of light detected by the PMT 94, the PMT 101, the PMT 114, the PMT 122, the PMT 126, and the PMT 131). Accordingly, the observation device D4 can acquire richer morphological information than that in a case in which a plurality of types of light are not simultaneously detected for an observation object. Acquiring rich morphological information means simultaneously detecting a plurality of types of light and simultaneously acquiring various types of information on morphology of an observation object.

In the observation device D4, the phase-difference waveform detection optical system 9 and the dark-field waveform detection optical system 11 detects light structured by the structural pattern masks (the structural pattern mask 91 and the structural pattern mask 112). That is, the observation device D4 can detect time-series waveforms of optical signals including spatial information of an observation object using so-called ghost cytometry through phase difference detection and dark field detection and acquire morphological information of the observation object from the detected time-series waveforms of the optical signals without conversion to a two-dimensional image.

Accordingly, the observation device D4 can be suitably used as a device that is provided in a flow cytometer as in this embodiment and acquires morphological information using ghost cytometry. With the ghost cytometry, since morphological information can be directly analyzed without converting measurement data to a two-dimensional image, it is possible to more rapidly acquire morphological information in comparison with the case in which measurement data is converted to a two-dimensional image.

Some of the detection optical systems may be omitted from the configuration of the observation device D4. For example, from the configuration of the observation device D4, the lens 61, the lens 62, and the camera 63 of the phase-difference transmitted image detection optical system 6 may be omitted, or the lens 57c and the camera 53c of the dark-field transmitted image detection optical system 5c may be omitted.

A bright-field image detection system and/or a bright-field waveform detection system may be added to the observation device D4. For example, the FSC detection optical system 10 is illustrated as a detection system of FSC that is generated by irradiating an observation object from the FSC/SSC light source 315c in FIG. 7, but a bright-field image detection system and/or bright-field waveform detection system may be provided in addition to the FSC detection optical system 10. In this case, reflected light from the reflecting member 51b may be divided using a wavelength filter or the like, a part of the divided reflected light may be detected by the FSC detection system, and the other part may be detected by the bright-field image detection system and/or the bright-field waveform detection system.

Fifth Embodiment

A fifth embodiment of the present invention will be described below with reference to the accompanying drawing.

In the fourth embodiment, an example in which detection is performed using a single-channel photodetector (a single PMT) has been described. In this embodiment, an example in which detection is performed using a multi-anode PMT will be described. The observation device according to this embodiment is referred to as an observation device D5. In this embodiment, cells will be described as an example of an observation object.

The same elements and operations as in the fourth embodiment will be referred to by the same reference signs and a description thereof will be omitted.

Figure 8:
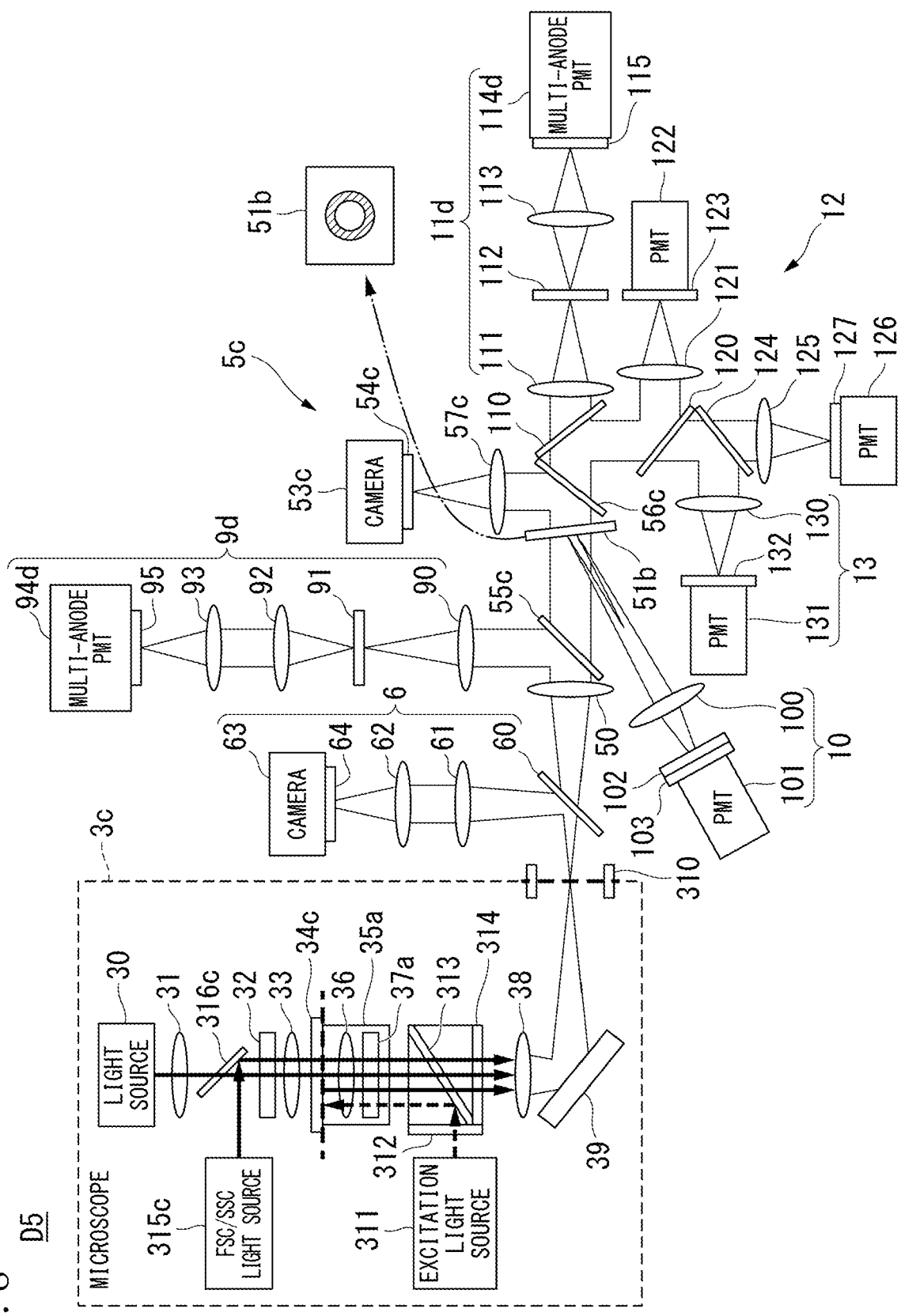
FIG. 8 is a diagram illustrating an example of a configuration of an observation device according to a fifth embodiment of the present invention.

FIG. 8 is a diagram illustrating an example of the configuration of the observation device D5 according to this embodiment. The observation device D5 illustrated in FIG. 8 is different from the observation device D4 illustrated in FIG. 7 in a phase-difference waveform detection optical system 9$d$ and a dark-field waveform detection optical system 11$d$.

The phase-difference waveform detection optical system 9$d$ is different from the phase-difference waveform detection optical system 9 in that a multi-anode PMT 94$d$ is provided instead of the single PMT. The dark-field waveform detection optical system 11$d$ is different from the dark-field waveform detection optical system 11 in that a multi-anode PMT 114$d$ is provided instead of the single PMT.

The multi-anode PMT 94$d$ and the multi-anode PMT 114$d$ are photodetectors including a plurality of channels. A channel is a photodetection element that detects light. The multi-anode PMT 94$d$ and the multi-anode PMT 114$d$ are an example of a detector including a plurality of photodetection elements. As the detector including a plurality of photodetection elements, a detector other than the multi-anode PMT may be provided instead of the multi-anode PMT. For example, a photodiode or the like including multi-channels may be provided as the detector including a plurality of photodetection elements.

Mask-modulated light from the structural pattern mask 91 is projected to the multi-anode PMT 94$d$. Mask-modulated light is light modulated by the structural pattern mask 91. The plurality of channels provided in the multi-anode PMT 94$d$ detect light modulated by the structural pattern mask 91 as mask-modulated light.

Mask-modulated light from the structural pattern mask 112 is projected to the multi-anode PMT 114$d$. Mask-modulated light is light modulated by the structural pattern mask 112. The plurality of channels provided in the multi-anode PMT 114$d$ detect light modulated by the structural pattern mask 112 as mask-modulated light.

Mask-modulated light M1 that is projected from the structural pattern mask 112 to the multi-anode PMT 114$d$ will be exemplified below as the mask-modulated light projected to the multi-anode PMT, with reference to FIG. 9. Mask-modulated light from the structural pattern mask 91 is the same as in FIG. 9 which will be described below.

Figure 9:
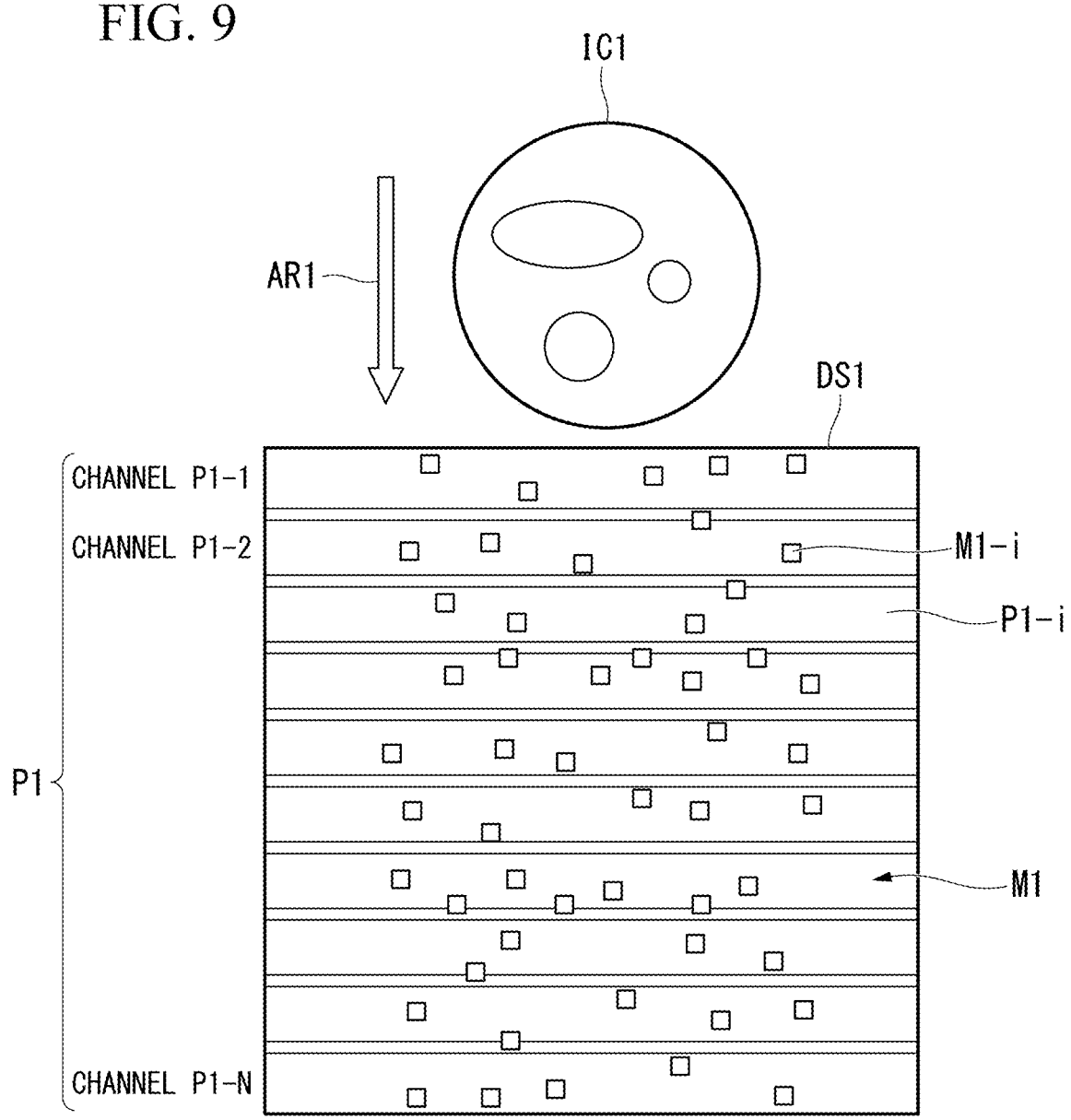
FIG. 9 is a diagram illustrating an example of mask-modulated light that is projected to a multi-anode PMT according to the fifth embodiment of the present invention.

FIG. 9 is a diagram illustrating an example of mask-modulated light M1 projected to the multi-anode PMT 114$d$ according to this embodiment. An image IC1 of cells which are an observation object flowing in the flow cell 34$c$ moves in a direction indicated by an arrow AR1 over the multi-anode PMT 114$d$. The arrow AR1 indicates a direction in which the image IC1 of cells moves over the multi-anode PMT 114$d$.

The mask-modulated light M1 shows a pattern of light passing through the structural pattern mask 112. The structural pattern mask 112 has, as an example, a mask pattern including random light-transmitting portions, and the mask-modulated light M1 in which the mask pattern of the structural pattern mask 112 is reflected is projected as a random patter of light to the multi-anode PMT 114$d$. Mask-modulated light M1-i is one of a plurality of pieces of transmitted light constituting the mask-modulated light M1.

Each of a plurality of channels P1 of the multi-anode PMT 114$d$ has a rectangular shape. The length in a longitudinal direction of the channels P1 is substantially equal to or greater than the length in a lateral direction of the mask-modulated light M1 projected to the multi-anode PMT 114$d$. As illustrated in FIG. 9, the plurality of channels P1 are arranged in series on a detection plane DS1 to be substantially parallel each other in the direction of the arrow AR1 with the longitudinal direction set to be substantially perpendicular to the arrow AR1. Each of the plurality of channels P1 illustrated as channels P1-1 to P1-N in FIG. 9 is a photodetection element. The channel P1-$i$ is one of the plurality of channels P1 and is an i-th photodetection element.

Figure 10:
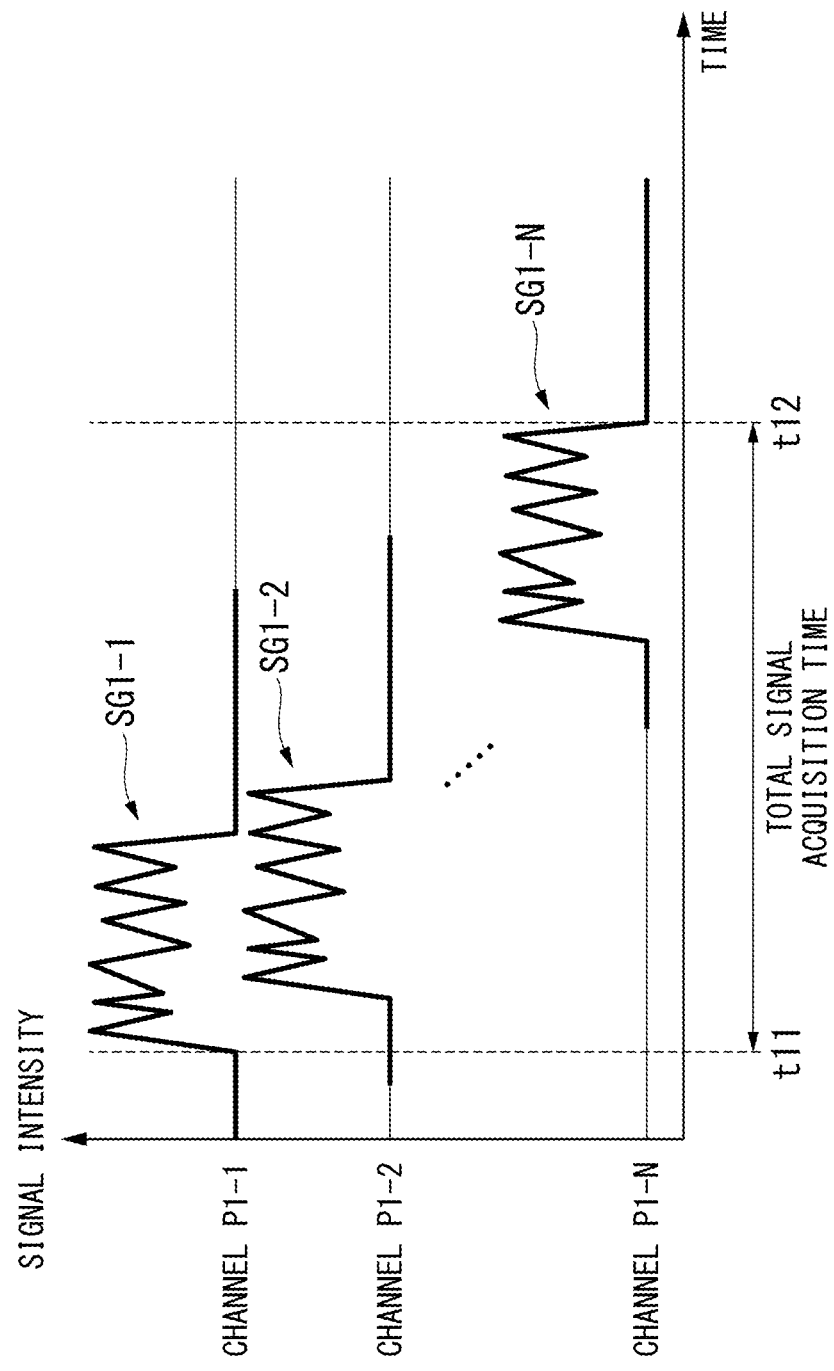
FIG. 10 is a diagram illustrating an example of signal intensities that are detected in a time series by a plurality of channels of the multi-anode PMT installed in the observation device according to the fifth embodiment of the present invention.

FIG. 10 illustrates an example of a time-series change in signal intensity detected by each of the plurality of channels P1. A signal SG1-1, a signal SG1-2, . . . , a signal SG1-N indicate time-series changes in intensity of signals detected by the channel P1-1, the channel P1-2, . . . , the channel P1-N. Since the plurality of channels P1 are arranged in series in the direction of the arrow AR1, the temporal order of detecting the signal SG1-1, the signal SG1-2, . . . , the signal SG1-N is the order in which the plurality of channels P1 are arranged in series in the direction of the arrow AR1. The length of a period from time t11 at which detection of the signal SG1-1 by the channel P1-1 starts to time t12 at which detection of the signal SG1-N by the channel P1-N ends is the total time in which the signals are acquired.

In a single PMT, a single photodetection element is assigned to the whole regions in which light as a signal is detected. Accordingly, in the single PMT, the ratio of a modulated signal due to passage of an observation object to a background signal detected in a state receiving no light modulation by the observation object decreases. On the other hand, in this embodiment, a plurality of photodetection elements in a multi-anode PMT divisionally detect signals in corresponding regions of the regions in which light is detected. With the multi-anode PMT, it is possible to enhance the ratio of the modulated signal to the background signal and to improve detection sensitivity in comparison with the case of a single PMT.

In FIG. 9, an example in which the structural pattern mask 112 used to detect dark-field waveforms is mask-modulated light M1 projected to the multi-anode PMT 114$d$ is illustrated, but mask-modulated light is also projected to the multi-anode PMT 94$d$ in the phase-difference waveform detection optical system 9$d$ in which detection is performed using the structural pattern mask as illustrated in FIG. 8.

In FIG. 8, an example in which the phase-difference waveform detection optical system 9$d$ and the dark-field waveform detection optical system 11$d$ include a structural pattern mask (the structural pattern mask 91 and the structural pattern mask 112) is illustrated, but the present invention is not limited thereto. For example, a structural pattern mask may be provided in the fluorescence detection optical system 12.

Modified Example of Fifth Embodiment

In the fifth embodiment, an example in which a plurality of channels of the multi-anode are arranged in series in the direction in which the image IC1 of cells move over the multi-anode PMT 114d as illustrated in FIG. 9 has been described. In this modified example, the plurality of channels of the multi-anode are arranged in parallel in the direction in which the image IC1 of cells move over the multi-anode PMT 114d. In this modified example, mask-modulated light from the structural pattern mask 112 will be explained as an example. However, for the structural pattern mask 91, the situation is also the same as the case which will be described below in FIG. 11. In this modified example, a description of the same configuration as the configuration in the fifth embodiment will be omitted, and differences from the fifth embodiment will be mainly described.

Figure 11:
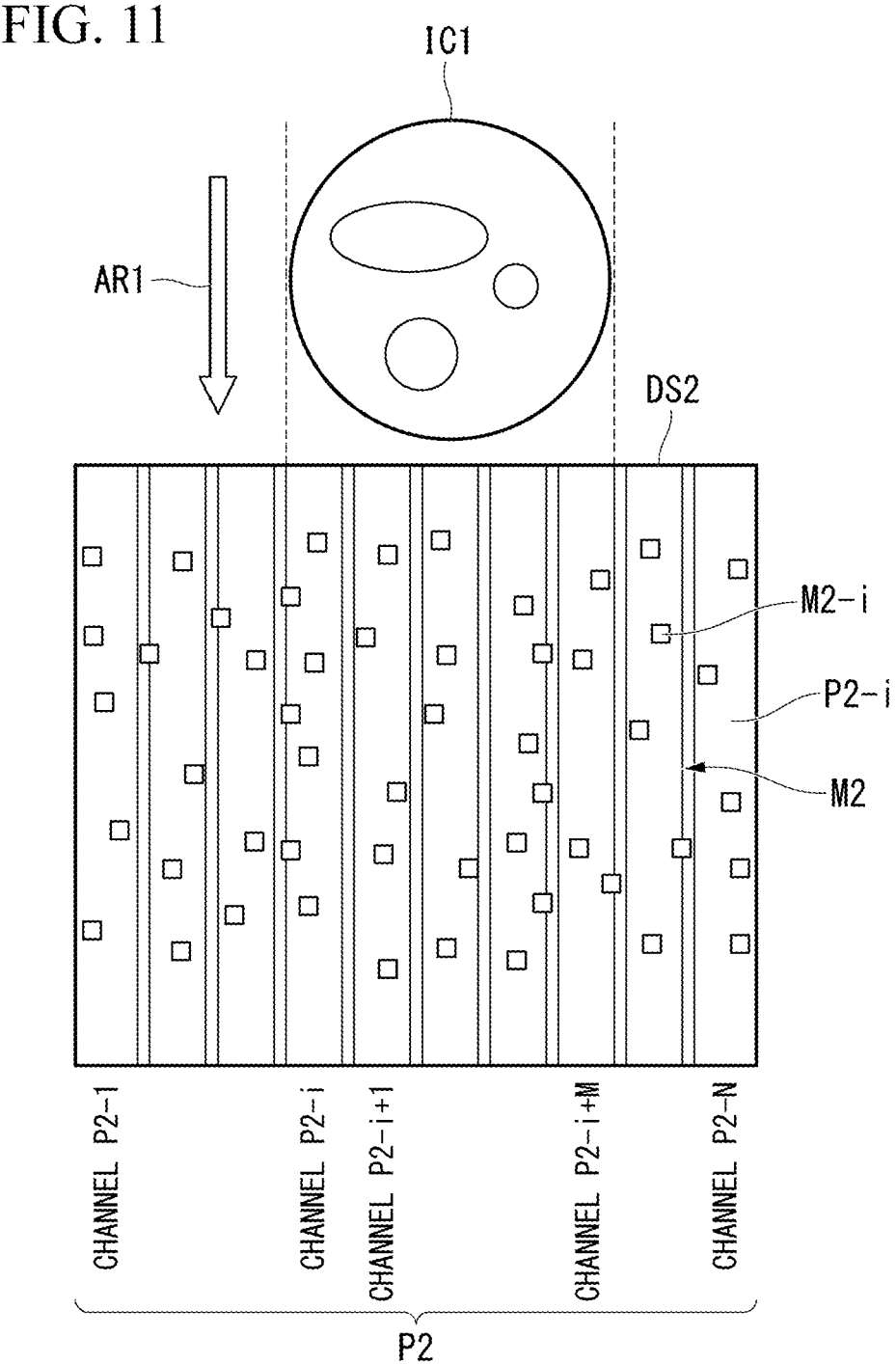
FIG. 11 is a diagram illustrating an example of mask-modulated light that is projected to a multi-anode PMT according to a modified example of the fifth embodiment of the present invention.

FIG. 11 is a diagram illustrating an example of mask-modulated light M2 projected to the multi-anode PMT 114d according to this embodiment. The mask-modulated light M2 is a pattern of light projected to the multi-anode PMT 114d including random light-transmitting portions similarly to the mask-modulated light M1 illustrated in FIG. 9. Mask-modulated light M2-i is one of a plurality of pieces of transmitted light constituting the mask-modulated light M2.

A plurality of channels P2 illustrated in FIG. 11 are different from the plurality of channels P1 illustrated in FIG. 9 in the direction with respect to the arrow AR1 in which the plurality of channels are arranged. The plurality of channels P2 are arranged in parallel in the direction of the arrow AR1 with the length direction thereof set to be substantially parallel to the arrow AR1. The sum of the lengths in the lateral direction of the plurality of channels P2 has only to be substantially equal to or greater than the length of the mask-modulated light M2 in the across-the-width direction projected to the multi-anode PMT 114d similarly to the length in the longitudinal direction of the channels P1 in FIG. 9. The channel P2-i is one of the plurality of channels P2 and is an i-th photodetection element illustrated as channels P2-1 to P2-N in FIG. 11.

Figure 12:
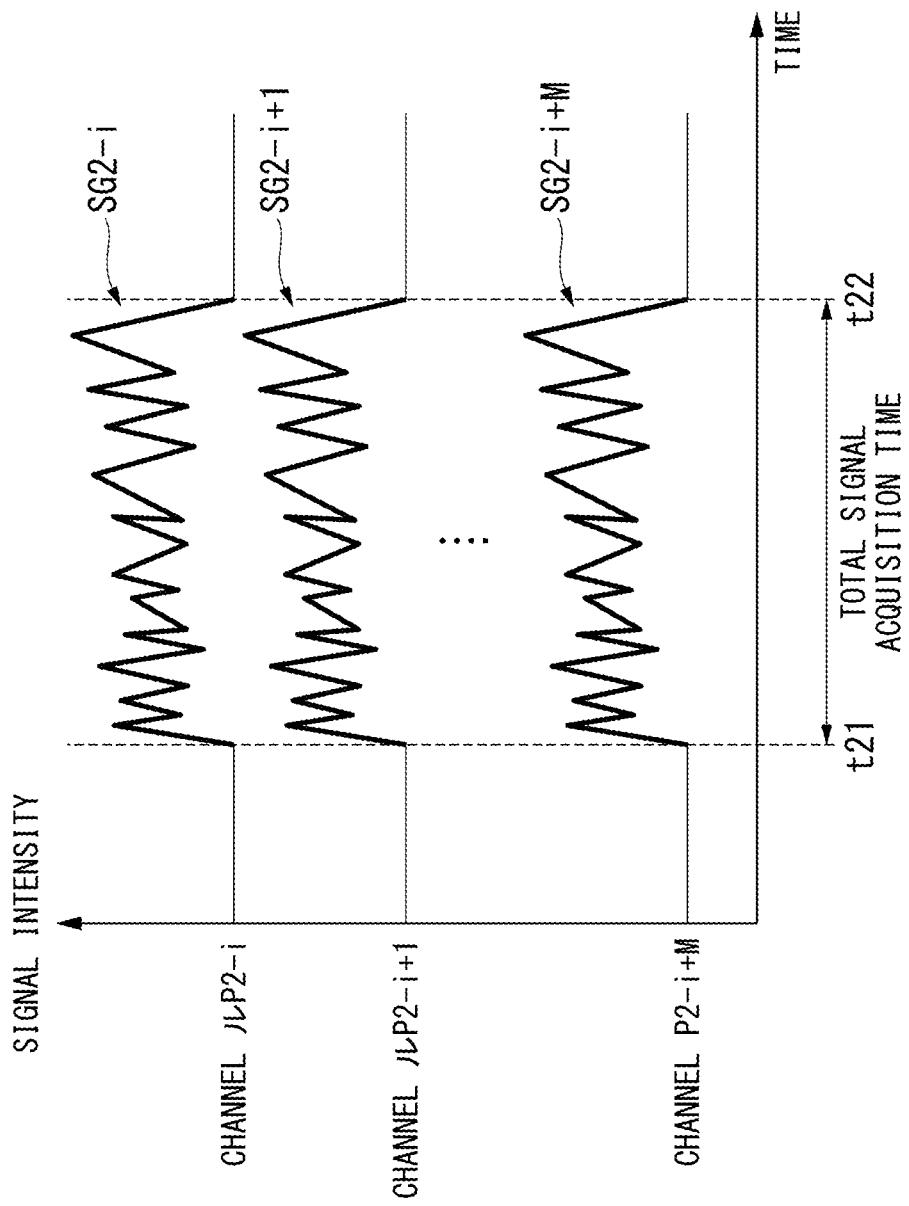
FIG. 12 is a diagram illustrating an example of signal intensities that are detected in a time series by each of the plurality of channels of the multi-anode PMT installed in the observation device according to the modified example of the fifth embodiment of the present invention.

An example of the time-series changes in signal intensity detected by each of the plurality of channels P2 is illustrated in FIG. 12. A signal SG2-i, a signal SG2-i+1, . . . , a signal SG2-i+M indicate intensities of signals detected by the channel P2-i, the channel P2-i+2, . . . , the channel P2-i+M, respectively. Since waveforms of the signal intensities detected by each of the channels are different from each other but the plurality of channels P2 are arranged in parallel in the direction of the arrow AR1 illustrated in FIG. 11, times in which each of the signal SG2-i, the signal SG2-i+1, . . . , the signal SG2-i+M are detected do not have a large difference. The length of a period from time t21 at which detection of the signal SG2-i, the signal SG2-i+1, . . . , the signal SG2-i+M starts to time t22 at which detection of the signal SG2-i, the signal SG2-i+1, . . . , the signal SG2-i+M ends is a total time in which the signals are acquired.

In FIG. 11, in channels other than the channel P2-i, the channel P2-i+1, . . . , the channel P2-i+M, the image IC1 does not pass through element surfaces thereof and thus signals of cells are not detected therethrough.

In the fifth embodiment and the modified example thereof, an example in which the plurality of channels of the multi-anode are arranged in the same direction between the mask-modulated light from the structural pattern mask 112 and the mask-modulated light from the structural pattern mask 91 has been described, but the plurality of channels of the multi-anode may be provided in different directions therebetween.

Sixth Embodiment

In the fifth embodiment, an example in which detection is performed using a structural pattern mask and a multi-anode PMT has been described. In a sixth embodiment, a plurality of independent photodetection elements (for example, a 1D array PD in which a plurality of photodiodes (PD) are arranged in a line) are used instead of using the structural pattern mask. The observation device according to this embodiment is referred to as an observation device D6. In the following description, a case in which a plurality of PDs are arranged in a line shape obliquely with respect to the direction in which a projected image IC1 of cells C1 moves over the detectors will be described as an example of the observation device D6.

The same elements and operations as in the fifth embodiment will be referred to by the same reference signs and a description thereof will be omitted.

Figure 13:
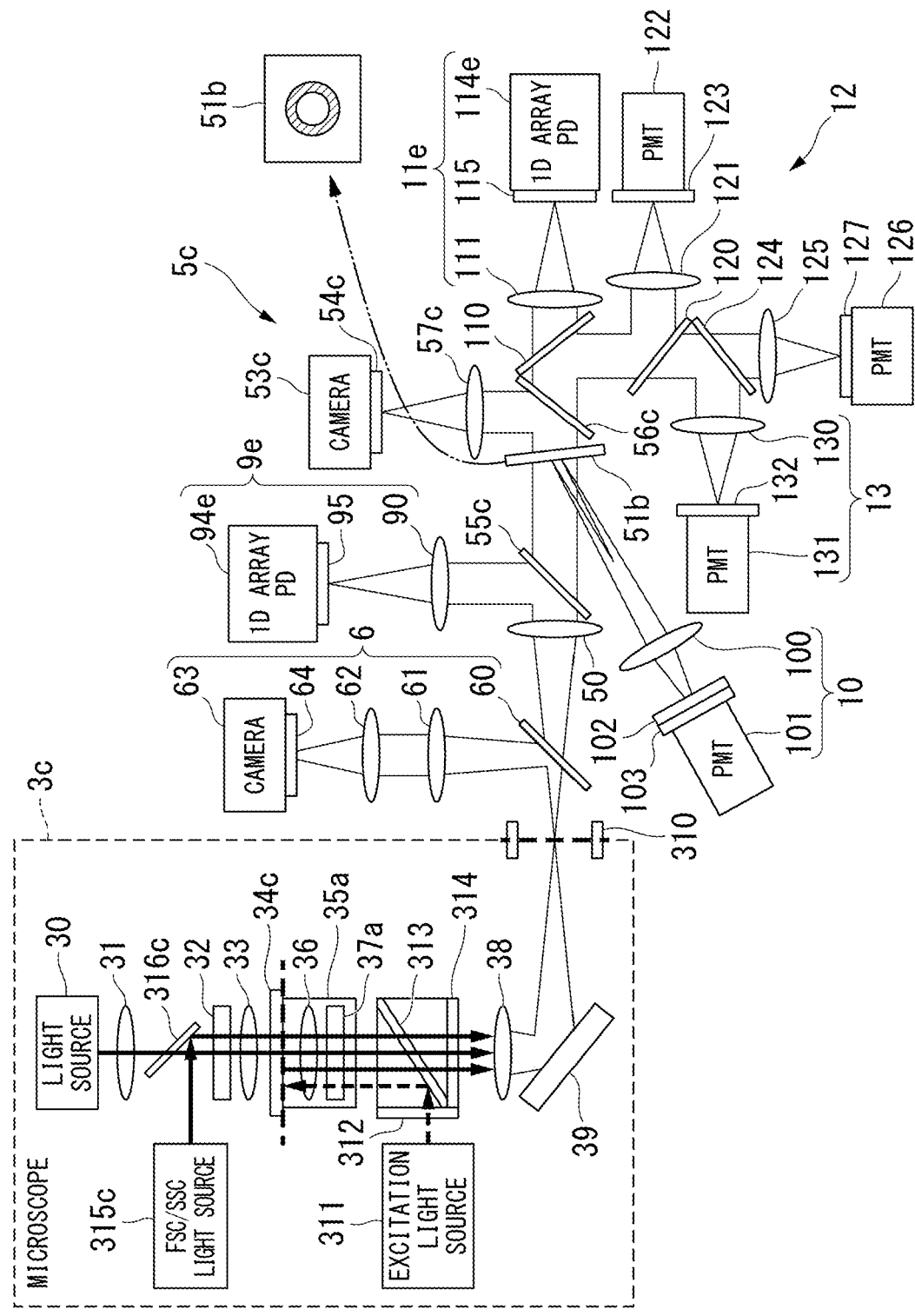
FIG. 13 is a diagram illustrating an example of a configuration of an observation device according to a sixth embodiment of the present invention.

FIG. 13 is a diagram illustrating an example of the configuration of the observation device D6 according to this embodiment. The observation device D6 illustrated in FIG. 13 is different from the observation device D5 illustrated in FIG. 8 in a phase-difference waveform detection optical system 9e and a dark-field waveform detection optical system 11e.

The phase-difference waveform detection optical system 9e includes a lens 90, a 1D array photodiode (PD) 94e, and a wavelength filter 95.

The dark-field waveform detection optical system 11e includes a dichroic mirror 110, a lens 111, a 1D array PD 114e, and a wavelength filter 115.

Here, a 1D array PD is a detector in which a plurality of photodiodes are arranged in a line shape. The 1D array PD 94e and the 1D array PD 114e are an example of a detector including a plurality of photodetection elements.

Arrangement of a plurality of channels P3 provided in the 1D array PD 94e will be described below with reference to FIG. 14. The same as the 1D array PD 94e is true of arrangement of a plurality of channels provided in the 1D array PD 114e.

Figure 14:
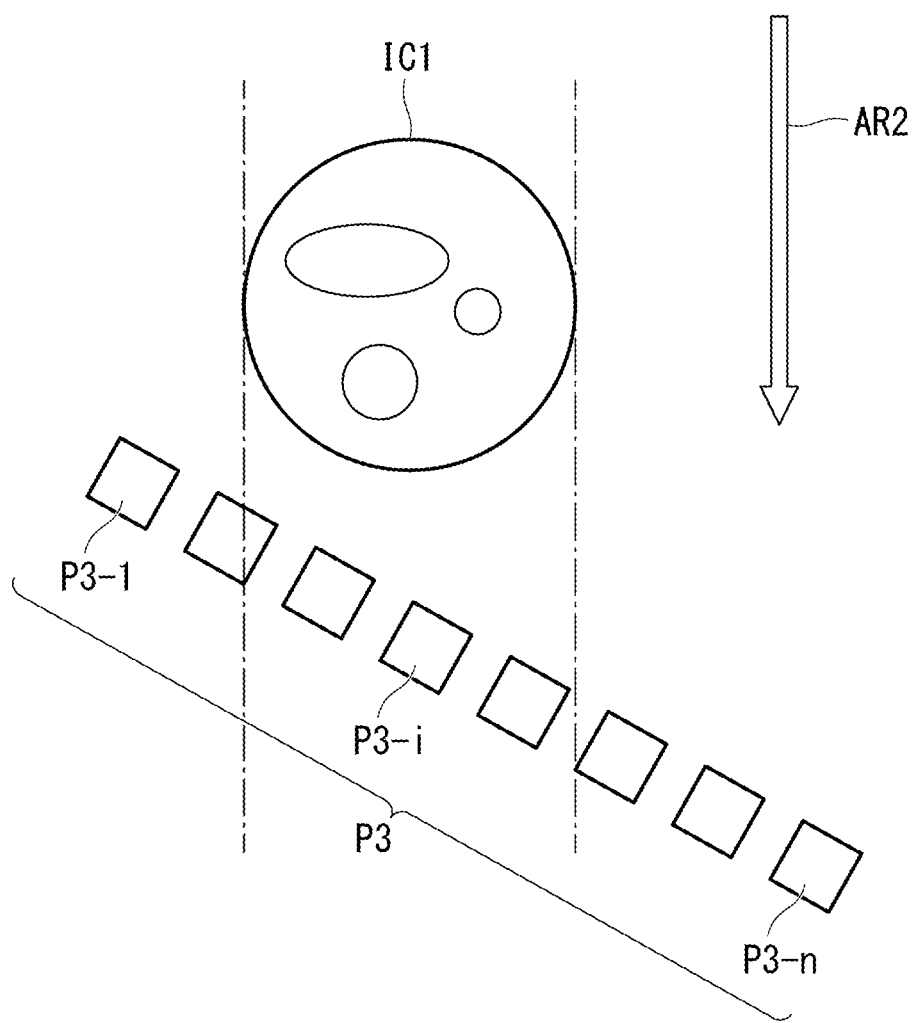
FIG. 14 is a diagram illustrating an example of arrangement of a plurality of channels of a 1D array PD in the observation device according to the sixth embodiment of the present invention.

FIG. 14 is a diagram illustrating an example of arrangement of the plurality of channels P3 in the 1D array PD 94e according to this embodiment. The image IC1 is an image which is generated by causing an image of cells C1 which are an example of an observation object flowing in a flow cell 34c. The image IC1 is formed on a detection plane of the 1D array PD 94e. An arrow AR2 in FIG. 14 indicates a direction in which the image IC1 of cells C1 flowing in the flow cell 34c passes through the plurality of channels P3.

The plurality of channels P3 include n channels from a channel P3-1 to a channel P3-n, and a channel P3-i is an i-th channel. Among the plurality of channels P3, neighboring channels are arranged with a predetermined gap.

In the 1D array PD 94e, the plurality of channels P3 are arranged obliquely by a predetermined angle with respect to a direction perpendicular to the direction in which the image IC1 of cells C1 moves and which is indicated by the arrow AR2. Accordingly, in the 1D array PD 94e, a length in a direction perpendicular to the arrow AR2 of a region in which light (that is, signals) emitted from the cells C1 cannot be detected due to the gaps between the plurality of channels P3 is shorter than the gaps in the case in which the plurality of channels P3 are arranged to be perpendicular to the direction of the arrow AR2. Alternatively, by arranging the channels to be oblique by a predetermined angle with respect to the arrow AR2 depending on the size of the channels P3 and the gap between the neighboring channels P3, it is possible to remove a region in which signals cannot be detected.

In the following description, arranging the plurality of channels P3 to be oblique by a predetermined angle with respect to the direction perpendicular to the direction in which the image IC1 of cells C1 moves which is indicated by the arrow AR2 may be simply referred to as obliquely arranging the plurality of channels P3.

On the other hand, in the 1D array PD 94e, since the plurality of channels P3 are obliquely arranged, the timing at which light emitted from cells C1 is detected by each of the plurality of channels P3 differs among the plurality of channels P3. In the following description, a difference in timing at which a signal is detected among individual channels of the plurality of channels P3 may be referred to as a one-cell measurement time. The one-cell measurement time is determined by the size of the image IC1 and the size of the plurality of channels P3.

Morphological information of a cell C1 measured by the plurality of channels P3 is independently acquired for each part of the cell C1. Accordingly, even when signal acquisition timings from the channels overlap temporally, independency of the signals are maintained.

Since the plurality of channels P3 are obliquely arranged, loss of a signal for each part of the cell C1 due to the gap between the neighboring channels P3 is suppressed. Accordingly, the observation device D5 can rapidly perform measurement while preventing morphological information acquired from a cell from losing for a part of the cell even when a structural pattern mask is not used.

The observation device D6 may simultaneously acquire a plurality of types of signals. That is, a signal based on phase difference observation, a signal based on dark field observation, a signal based on a fluorescence image, and a signal based on scattered light can be simultaneously detected using the same method by the phase-difference waveform detection optical system 9e, the dark-field waveform detection optical system 11e, the fluorescence detection optical system 12, and the FSC detection optical system 10 and the SSC detection optical system 13, respectively.

By adjusting focal distances of the lens 90 and the lens 111 which are relay lenses, it is possible to change ratios of sizes between the image IC1 and the individual channels of the plurality of channels P3. By changing the ratios, the gap between the neighboring channels of the plurality of channels P3 can be effectively set to be equal to or less than a value corresponding to a spatial resolution. By effectively setting the gap between the neighboring channels to be equal to or less than a value corresponding to the spatial resolution, it is possible to minimize the loss of morphological information acquired from a cell for a part of the cell due to the gap between the channels.

When the size ratios between the image IC1 and the plurality of channels P3 are changed as described above, the plurality of channels P3 can be arranged in the direction substantially perpendicular to the direction in which the image IC1 of a cell moves instead of obliquely arranging the plurality of channels P3. In this case, the one-cell measurement time is a time in which the image IC1 passes through the channels arranged in the direction substantially perpendicular to the direction in which the image of a cell moves.

In ghost cytometry, it is not necessary to completely reconfigure an image. Accordingly, even when an effective size of the gap between the neighboring channels is not equal to or less than the spatial resolution, it may be possible to achieve satisfactorily high classification accuracy using the observation device D6.

In the aforementioned embodiments, an example in which light is caused to form an image on the detection plane of a single PMT which is a detector by a lens has been described, but the present invention is not limited thereto. The lens may simply concentrate light on the detection plane of the single PMT. For example, since reconfiguration of a two-dimensional image is not necessary in ghost imaging, the lens 93 in the observation device D4 illustrated in FIG. 7 does not form an image of light on the detection plane of the PMT 94 but has only to satisfactorily concentrate light. In the multi-anode PMT illustrated in FIG. 8 or the 1D array PD illustrated in FIG. 13, there is higher necessity for forming an image of incident light on the detection plane in comparison with the single PMT, but a strict image-forming relationship is not necessary.

Summary of Embodiments

As described above, the observation device D1 according to the aforementioned embodiment includes an illumination optical system and an observation optical system.

The illumination optical system includes a light source 30 and an aperture member (the slit 32 in the aforementioned embodiments). The observation optical system includes an objective lens 36, an optical structure (the light blocking plate 37 in the aforementioned embodiments), and a detector (the camera 4 in the aforementioned embodiments).

The optical structure (the light blocking plate 37 in the aforementioned embodiments) is disposed at a first position which is conjugate with a position at which the aperture member (the slit 32 in the aforementioned embodiments) is disposed. The optical structure (the light blocking plate 37 in the aforementioned embodiments) includes a blocking portion that blocks light and a transmitting portion that transmits light. The shape of blocking portion includes a shape of an image of an aperture of the aperture member (the slit 32 in the aforementioned embodiments) which is formed on the optical structure (the light blocking plate 37 in the aforementioned embodiments). The detector (the camera 4 in the aforementioned embodiments) detects dark-field light passing through the optical structure (the light blocking plate 37 in the aforementioned embodiments).

As described above, the observation devices D2, D3, D4, D5, and D6 according to the aforementioned embodiments include an illumination optical system and an observation optical system.

The illumination optical system includes a light source 30 and an aperture member (the slit 32 in the aforementioned embodiments).

The observation optical system includes an objective lens 36, an optical structure (the light blocking plate 51 and the reflecting member 51b in the aforementioned embodiments), a second optical structure (the phase plate 37a in the aforementioned embodiments), and a detector (the cameras 53, 53c, 63, 71, 82, and 85, the PMTs 94, 101, 114, 122, 126, and 131, the multi-anode PMTs 94d and 114d, and the 1D array PDs 94e and 114e in the aforementioned embodiments).

The optical structure (the light blocking plate 51 and the reflecting member 51b in the aforementioned embodiments) is disposed at the first position (a position conjugate with the position at which the slit 32 is disposed in the aforementioned embodiments) which is conjugate with the position at which the aperture member (the slit 32 in the aforementioned embodiments) is disposed. The optical structure (the light blocking plate 51 and the reflecting member 51b in the aforementioned embodiments) includes a blocking portion that blocks light and a transmitting portion that transmits light, and the shape of the blocking portion includes a shape of an image of the aperture of the aperture member (the slit 32 in the aforementioned embodiments) which is formed on the optical structure (the light blocking plate 51 and the reflecting member 51b in the aforementioned embodiments).

The detector (the cameras 4, 53, 53c, 63, 71, 82, and 85, the PMTs 94, 101, 114, 122, 126, and 131, the multi-anode PMTs 94d and 114d, and the 1D array PDs 94e and 114e in the aforementioned embodiments) detects light passing through the optical structure (the light blocking plate 51 and the reflecting member 51b in the aforementioned embodiments) or the second optical structure (the phase plate 37a according to the aforementioned embodiments).

With this configuration, since the spatial resolution in the observation devices D1, D2, D3, D4, D5, and D6 can be enhanced by increasing the numerical aperture of the objective lens in comparison with that in the dark-field observation according to the related art, it is possible to acquire morphological information with a higher resolution than that acquired in the related art in the observation of an observation object.

The observation devices D1, D2, D3, D4, D5, and D6 can acquire richer morphological information of an observation object such as cells using a label-free/fluorescence imaging detection means in comparison with an observation device according to the related art. In the observation devices D4, D5, and D6 according to the embodiments, detection means that can acquire morphological information of an observation object with a high resolution, without reconfiguring an image, from time-series waveform information of an optical signal can be used in combination.

The observation devices D2, D3, D4, D5, and D6 according to the aforementioned embodiments further include a second optical structure (the phase plate 37a according to the aforementioned embodiments) and a phase difference detector (the camera 63, the PMT 94, the multi-anode PMT 94d, and the 1D array PD 94e in the aforementioned embodiments).

The second optical structure (the phase plate 37a according to the aforementioned embodiments) includes a phase changing portion that changes a phase of light and a transmitting portion that transmits light, and a shape of an image of the aperture of the aperture member which is formed on the phase changing portion substantially identical to a shape of the phase changing portion. The second optical structure (the phase plate 37a according to the aforementioned embodiments) is disposed at a second position which is conjugate with the position at which the aperture member is disposed and which does not correspond to the first position.

The phase difference detector (the camera 63, the PMT 94, the multi-anode PMT 94d, and the 1D array PD 94e in the aforementioned embodiments) detects a phase difference between direct light passing through the transmitting portion of the second optical structure (the phase plate 37a according to the aforementioned embodiments) and diffracted light or scattered light out of the light emitted from the observation object (the cells C1 according to the aforementioned embodiments) at a position closer to the objective lens 36 than the optical structure (the light blocking plate 51 and the reflecting member 51b in the aforementioned embodiments) in an optical path between the objective lens 36 and the detector (the cameras 53, 53c, 63, 71, 82, and 85, the PMTs 94, 101, 114, 122, 126, and 131, the multi-anode PMTs 94d and 114d, and the 1D array PDs 94e and 114e in the aforementioned embodiments).

With this configuration, since the observation devices D2, D3, D4, D5, and D6 according to the aforementioned embodiments can simultaneously perform measurement based on dark field observation and measurement based on phase difference observation, it is possible to acquire richer morphological information than that in a case in which dark field observation and phase difference observation are not simultaneously performed.

In the observation devices D4 and D5 according to the embodiments, the observation optical system further includes a spatial modulation unit (the structural pattern mask 91 in the aforementioned embodiments) that modulates some light passing through the second optical structure (the phase plate 37a according to the aforementioned embodiments) and a phase-difference waveform detection optical system 9 or 9d that detects light modulated by the spatial modulation unit (the structural pattern mask 91 in the aforementioned embodiments).

With this configuration, since the observation devices D4, D5, and D6 according to the aforementioned embodiments can simultaneously perform measurement based on phase-difference image observation or dark-field image observation and measurement based on phase difference waveform detection, it is possible to acquire richer morphological information than that in the case in which the phase difference waveform detection and the phase difference observation or the dark-field image observation are not simultaneously performed. Since the observation devices D4 and D5 according to the aforementioned embodiments can acquire morphological information on phase-difference waveforms of an observation object on the basis of the ghost cytometry technique through the phase-difference waveform detection without converting the morphological information to a two-dimensional image, it is possible to more rapidly acquire morphological information with a higher resolution than that in the case in which the morphological information is converted to a two-dimensional image.

In the observation devices D3, D4, D5, and D6 according to the aforementioned embodiments, the illumination optical system further includes an epi-fluorescence illumination optical system (a ground of the excitation light source 311, the excitation filter 312, and the dichroic mirror 313 in the aforementioned embodiments) that irradiates the observation object (the cells C1 in the aforementioned embodiments) with illumination light from below, and the observation optical system further includes an epi-fluorescence detector (the camera 82, the camera 85, the PMT 122, and the PMT 126 in the aforementioned embodiments) that detects fluorescence which has been generated by irradiating the observation object (the cells C1 in the aforementioned embodiments) with the illumination light from the epi-fluorescence illumination optical system (a ground of the excitation light source 311, the excitation filter 312, and the dichroic mirror 313 in the aforementioned embodiments) and which has passed through the optical structure (the light blocking plate 51 and the reflecting member 51b in the aforementioned embodiments).

With this configuration, since the observation devices D3, D4, D5, and D6 according to the aforementioned embodiments can simultaneously perform measurement based on other observation (for example, measurement based on dark field observation such as dark-field transmitted image observation or dark-field waveform detection) and measurement based on epi-fluorescence observation, it is possible to acquire richer morphological information than that in the case in which the epi-fluorescence observation is not simultaneously performed.

The observation devices D4 and D5 according to the aforementioned embodiments further include a micro-fluid device, a spatial modulation unit (the structural pattern mask 112 according to the aforementioned embodiments), and a dark-field waveform detection optical system 11.

The micro-fluid device includes a flow channel (the flow cell 34c in the aforementioned embodiments) in which the observation object (the cells C1 in the aforementioned embodiments) is able to flow along with a fluid.

The spatial modulation unit (the structural pattern mask 112 in the aforementioned embodiments) modulates some light passing through the optical structure (the reflecting member 51b in the aforementioned embodiments).

The dark-field waveform detection optical system 11 detects light modulated by the spatial modulation unit (the structural pattern mask 112 in the aforementioned embodiments).

With this configuration, since the observation devices D4 and D5 according to the aforementioned embodiments can simultaneously perform measurement based on other observation (for example, measurement based on fluorescence detection or SSC or FSC detection) and measurement based on dark-field waveform detection, it is possible to acquire richer morphological information than that in the case in which the other observation and the dark-field waveform observation are not simultaneously performed. Since the observation devices D4 and D5 according to the aforementioned embodiments can acquire morphological information of an observation object which is able to flow in a flow channel along with a fluid according to the ghost cytometry technique without converting the morphological information to a two-dimensional image, it is possible to acquire morphological information with a high resolution more rapidly than that in the case in which the morphological information is converted to a two-dimensional image.

Among the aforementioned embodiments, similarly to the observation device D4, the observation device D5 includes a micro-fluid device including a flow channel (the flow cell 34c in the aforementioned embodiments) in which the observation object (the cells C1 in the aforementioned embodiments) is able to flow along with a fluid. In the observation device D5, the detector (the multi-anode PMT 94d and the multi-anode PMT 114d in the aforementioned embodiment) that detects light modulated by the spatial modulation unit (the structural pattern mask 91 and the structural pattern mask 112 in the aforementioned embodiment) includes a plurality of photodetection elements (the channels P1 in the aforementioned embodiment).

In an example of the observation device D5 according to the aforementioned embodiment, the spatial modulation unit (the structural pattern mask 91 and the structural pattern mask 112 in the aforementioned embodiment) randomly modulates the light passing through the optical structure (the reflecting member 51b in the aforementioned embodiment) for each region and causes the modulated light to be incident as mask-modulated light on the detector (the detection plane DS1 of the detector in the aforementioned embodiment).

The plurality of photodetection elements (the channels P1 in the aforementioned embodiment) are arranged in series in a direction in which a longitudinal direction thereof is substantially perpendicular to a direction (the direction of the arrow AR1 in the aforementioned embodiment) in which an image IC1 of the observation object (the cells C1 in the aforementioned embodiment) flowing in the flow channel (the flow cell 34c in the aforementioned embodiment) moves over the detector.

With this configuration, since the observation device D5 according to the embodiment can detect signals in series using the plurality of photodetection elements while preventing morphological information acquired from cells from losing for parts of cells when a random pattern is used, it is possible to more rapidly perform measurement.

In another example of the observation device D5 according to the aforementioned embodiment, the spatial modulation unit (the structural pattern mask 91 and the structural pattern mask 112 in the aforementioned embodiment) randomly modulates the light passing through the optical structure (the reflecting member 51b in the aforementioned embodiment) and causes the modulated light to be incident on the detector (the detection plane DS2 of the detector in the aforementioned embodiment). The spatial modulation unit (the structural pattern mask 91 and the structural pattern mask 112 in the aforementioned embodiment) randomly modulates the light passing through the optical structure (the reflecting member 51b in the aforementioned embodiment) for each region.

The plurality of photodetection elements (the channels P2 in the aforementioned embodiment) of the detector are arranged in a direction in which the longitudinal direction thereof is substantially parallel to the direction (the direction of the arrow AR1 in the aforementioned embodiment) in which an image IC1 of the observation object (the cells C1 in the aforementioned embodiment) flowing in the flow channel (the flow cell 34c in the aforementioned embodiment) moves over the detector.

With this configuration, since the observation device D5 according to the embodiment can simultaneously detect signals in parallel using the plurality of photodetection elements while preventing the acquired morphological information of parts of cells from losing between the plurality of photodetection elements when mask-modulated light with a random pattern is used, it is possible to perform rapid measurement.

Similarly to the observation device D5 according to the aforementioned embodiment, the observation device D6 according to the aforementioned embodiment further includes a micro-fluid device including a flow channel (the flow cell 34c in the aforementioned embodiment) in which the observation object (the cells C1 in the aforementioned embodiment) is able to flow along with a fluid.

On the other hand, unlike the observation device D5 according to the aforementioned embodiment, in the detector (the 1D array PD 94e and the 1D array PD 114e in the aforementioned embodiment) in the observation device D6, the plurality of photodetection elements (the channels P3 in the aforementioned embodiment) are arranged in line as a straight line inclined by a predetermined angle with respect to the direction (the direction of the arrow AR2 in the aforementioned embodiment) in which an image IC1 of the observation object (the cells C1 in the aforementioned embodiment) flowing in the flow channel (the flow cell 34c in the aforementioned embodiment) moves over the detector. Some light passing through the optical structure (the reflecting member 51b in the aforementioned embodiment) or the second optical structure (the phase plate 37a according to the aforementioned embodiment) is detected by the plurality of photodetection elements (the channels P3 in the aforementioned embodiment) arranged on a line.

With this configuration, the observation device D6 according to the embodiment can enable acquiring of morphological information with a high spatial resolution without reconfiguring an image from the time-series waveform information of optical signals when mask-modulated light based on a structural mask pattern is not used. The observation device D6 can achieve rapid measurement while preventing morphological information acquired from cells from losing for parts of cells by arranging the plurality of photodetection elements in line as a straight line inclined by the predetermined angle with respect to the direction (the direction of the arrow AR2 in the aforementioned embodiment) in which the image IC1 moves over the detector.

While an embodiment of the present invention has been described above in detail with reference to the drawings, the specific configuration thereof is not limited to the above-described configurations and can be subjected to various modifications in design without departing from the gist of the present invention.

REFERENCE SIGNS LIST

D1, D2, D3, D4, D5, D6 . . . Observation device
30 . . . Light source
32 . . . Slit
36 . . . Objective lens
37, 51 . . . Light blocking plate
51b . . . Reflecting member
4, 53, 53c, 63, 71, 82, 85 . . . Camera
94, 101, 114, 122, 126, 131 . . . PMT
94d, 114d . . . Multi-anode PMI
94e, 114e . . . 1D array PD

What is claimed is:

1. An observation device comprising:
a light source;
an aperture member comprising an aperture;
a flow channel configured to direct an object to flow;
an objective lens;
an optical structure disposed at a position which is conjugate with another position that the aperture member is disposed, wherein the optical structure comprises:
a phase changing region configured to generate a phase modified light by modulating a phase of a first portion of light from the object; and
a transmitting region configured to generate a transmitted light by transmitting a second portion of the light from the object;
a spatial modulator comprising a plurality of regions with different optical characteristics; wherein the spatial modulator is configured to (1) modulate at least a portion of the phase modified light to generate a first modulated light or (2) modulate at least a portion of the transmitted light to generate a second modulated light; and
a detector configured to detect at least a portion of the first modulated light or at least a portion of the second modulated light.

2. The observation device of claim 1, wherein the detector further comprises a plurality of photodetection elements, wherein the plurality of photodetection elements are arranged perpendicular to the flow channel.

3. The observation device of claim 1, wherein the detector further comprises a plurality of photodetection elements, wherein the plurality of photodetection elements are arranged parallel to the flow channel.

4. The observation device of claim 1, wherein the first portion of the light comprises scattered light or diffracted light.

5. The observation device of claim 1, wherein the second portion of the light comprises direct light.

6. The observation device of claim 1, wherein the first portion of the light comprises direct light.

7. The observation device of claim 1, wherein the second portion of the light comprises scattered light or diffracted light.

8. The observation device of claim 1, wherein the spatial modulator is configured to (1) modulate the at least the portion of the phase modified light to generate the first modulated light and (2) modulate the at least the portion of the transmitted light to generate the second modulated light.

9. The observation device of claim 1, further comprising a condenser lens positioned between the aperture member and the flow channel.

10. The observation device of claim 1, wherein the aperture comprises a ring shape.

11. The observation device of claim 1, wherein the phase changing region comprises a ring shape.

12. The observation device of claim 1, further comprising a phase difference detector configured to detect a phase difference between the phase modified light and the transmitted light.

13. The observation device of claim 12, further comprising a first mirror configured to direct a first portion of the phase modified light or a first portion of the transmitted light towards the phase difference detector and a second portion of the phase modified light or a second portion of the transmitted light towards the spatial modulator.

14. The observation device of claim 1, further comprising another optical structure comprising (1) a blocking region or a reflecting region configured to hinder a first fraction of the phase modified light or a first fraction of the transmitted light, and (2) another transmitting region configured to generate another transmitted light by transmitting a second fraction of the phase modified light or a second fraction of the transmitted light.

15. The observation device of claim 14, wherein the blocking region or the reflection region is a ring shape.

16. The observation device of claim 14, further comprising a second mirror configured to direct a first part of the phase modified light or the transmitted light towards the another optical structure and a second part of the phase modified light or the transmitted light towards the spatial modulator.

17. The observation device of claim 14, further comprising another detector configured to detect the another transmitted light from the another transmitting region.

18. The observation device of claim 14, further comprising an additional spatial modulator configured to modulate at least a portion of another transmitted light to generate another modulated light.

19. The observation device of claim 18, further comprising an additional detector configured to detect the another modulated light from the additional spatial modulator.

20. The observation device of claim 1, further comprising an excitation light source configured to irradiate at least a portion of the flow channel with excitation light.

21. The observation device of claim 1, further comprising a fluorescence detector configured to detect fluorescence from the object.

* * * * *